(12) United States Patent
Kneeskern et al.

(10) Patent No.: US 12,532,974 B2
(45) Date of Patent: Jan. 27, 2026

(54) DISPLAY CASE WITH MOUNTABLE PANELS

(71) Applicant: Gaylord Bros., Inc., North Syracuse, NY (US)

(72) Inventors: Robert C. Kneeskern, Clay, NY (US); Amanda L. Rose, Parrish, FL (US); Joy A. Manna, Manlius, NY (US); Luke E. Cody, Syracuse, NY (US); Ile Louie Kocevski, Liverpool, NY (US); Mark Pike, Altmar, NY (US); James P. Burke, Baldwinsville, NY (US); Ethan George Laverack, Southbury, CT (US); John Richard Laverack, Southbury, CT (US); Kurt Raymond Weseman, Hamden, CT (US)

(73) Assignee: GAYLORD BROS., INC., North Syracuse, NY (US)

( * ) Notice: Subject to any disclaimer, the term of this patent is extended or adjusted under 35 U.S.C. 154(b) by 405 days.

(21) Appl. No.: 18/312,812

(22) Filed: May 5, 2023

(65) Prior Publication Data
US 2023/0355010 A1 Nov. 9, 2023

Related U.S. Application Data

(60) Provisional application No. 63/338,521, filed on May 5, 2022.

(51) Int. Cl.
*A47F 3/00* (2006.01)
*A47B 96/20* (2006.01)

(52) U.S. Cl.
CPC .............. *A47F 3/004* (2013.01); *A47F 3/005* (2013.01); *A47B 2096/209* (2013.01)

(58) Field of Classification Search
CPC .... A47F 3/004; A47F 3/005; A47B 2096/209; A47B 47/0083
USPC ...................... 312/265.1, 265.2, 265.3, 265.4
See application file for complete search history.

(56) References Cited

U.S. PATENT DOCUMENTS

| | | | |
|---|---|---|---|
| 125,844 | A | 4/1872 | Rice |
| 1,032,674 | A | 7/1912 | Holland |
| 1,846,485 | A * | 2/1932 | Hart ....................... F16B 12/02 |
| | | | 296/29 |
| 3,359,022 | A | 12/1967 | Russell |
| 3,381,430 | A | 5/1968 | Wiczer |
| 3,633,790 | A | 1/1972 | Voss |
| 3,688,458 | A | 9/1972 | Inmon et al. |
| 3,866,381 | A | 2/1975 | Eschbach et al. |
| 3,876,270 | A | 4/1975 | White |
| 4,332,119 | A | 6/1982 | Toews |
| 4,712,942 | A | 12/1987 | Brown |

(Continued)

FOREIGN PATENT DOCUMENTS

| | | | | |
|---|---|---|---|---|
| DE | | 2320631 A1 | 11/1974 | |
| DE | 102010023408 A1 * | 12/2011 | ............. A47B 96/20 |
| FR | | 2998623 A1 | 5/2014 | |

*Primary Examiner* — Matthew W Ing
(74) *Attorney, Agent, or Firm* — QUARLES & BRADY LLP

(57) ABSTRACT

A display case can include panels, and frame members (e.g., corner extrusions) that secure the panels. In some examples, the frame members can magnetically secure the panels together in an assembled configuration of the display case. In some examples, the frame members can cooperate to provide improved mounting and demounting processes.

17 Claims, 20 Drawing Sheets

(56) References Cited

U.S. PATENT DOCUMENTS

| | | |
|---|---|---|
| 4,840,440 A | 6/1989 | Dieter |
| 5,058,333 A | 10/1991 | Schwartz |
| 5,398,468 A | 3/1995 | Erickson |
| 6,332,657 B1 | 12/2001 | Fischer |
| 6,375,284 B1 | 4/2002 | Frank |
| 6,398,322 B1 | 6/2002 | Chaplin |
| 7,322,770 B2 | 1/2008 | Frank |
| D857,925 S | 8/2019 | Frank |
| D857,926 S | 8/2019 | Frank |
| 10,555,625 B2 | 2/2020 | Frank |
| 2009/0269131 A1 | 10/2009 | Kindig et al. |
| 2018/0222628 A1* | 8/2018 | Akhavan-Tabassi .... B65D 7/24 |

* cited by examiner

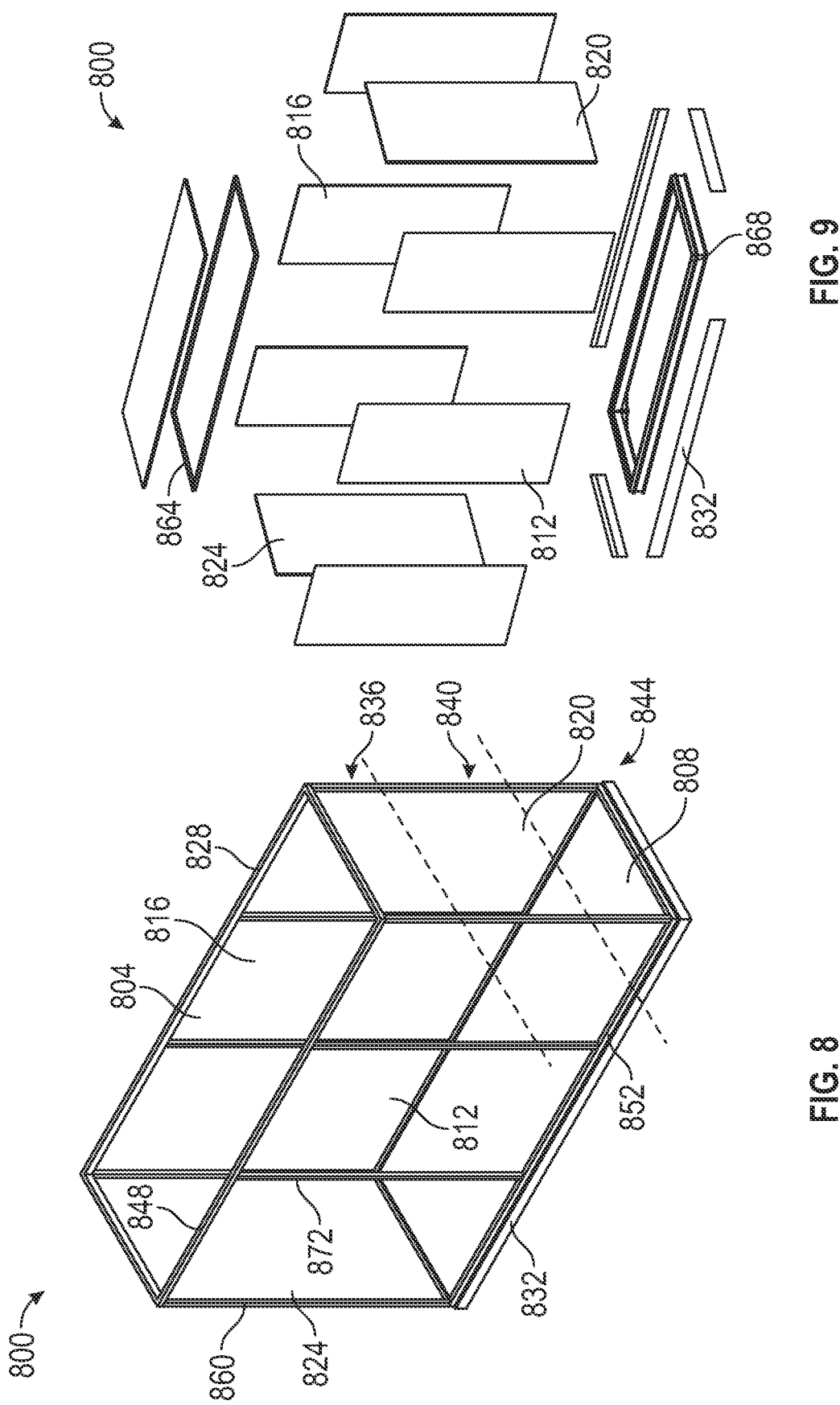

DISPLAY CASE WITH MOUNTABLE PANELS

CROSS REFERENCE TO RELATED APPLICATIONS

This application claims priority to and incorporates by reference U.S. provisional patent application 63/338,521, filed on May 5, 2022.

BACKGROUND

1. Field of the Disclosure

The present disclosure relates to display cases, and more specifically to mountable display case systems that can be easily assembled ("mounted") and disassembled ("demounted") at a display location.

2. Description of the Background of the Disclosure

A display case is generally an enclosure comprising at least one transparent or translucent surface. A transparent surface of a display case, for example, can provide a clear view of an object that is enclosed within the display case. Typically, a glass or an acrylic sheet is used to fabricate a panel for at least a portion of the display case.

Display cases may be used in an exhibition or a museum to display artifacts and artwork. Depending on the delicacy of the object that is being displayed, different types of display cases may be used for appropriate security, conservation, environmental control, and clarity for the object enclosed within. In addition, different types of display cases can be used depending on the size of the object that is being displayed, including a free-standing case (e.g., a mannequin, tower, or pedestal case), a wall display case (e.g., a free-standing case designed to positioned against a solid wall), a counter type case, etc. Further, different types of display cases may be assembled and disassembled with different routines.

SUMMARY

Generally, embodiments of the disclosed technology can include, in various combinations, a magnetic or otherwise improved joint assembly (e.g., at a corner joint). Some embodiments can include arrangements of frame members configured for assembly and disassembly without removal of edge pieces from associated panels, or with various other features or benefits.

According to one aspect, a display case can include a first panel having a first edge profile, a second panel having a second edge profile, a first edge piece having a first recess that receives the first edge profile to secure the first edge piece to the first panel, and a second edge piece having a second recess that receives the second edge profile to secure the second edge piece to the second acrylic panel. The first edge piece can include a first magnetic component (e.g., a rare earth or other magnet). The second edge piece can include a second magnetic component (e.g., a ferrous component or a second magnet). The first magnetic component can be aligned with the second magnetic component to magnetically secure the first and second panels together at a panel joint (e.g., corner joint) of the display case.

According to another aspect, a display case can include a first panel with a first edge profile, a second panel with a second edge profile, a first extruded edge piece that includes at least one first magnet, and a second extruded edge piece that includes at least one magnetic component (e.g., one or more of: at least one second magnet or at least one ferrous component). The first and second extruded edges can engage the first and second panels at the first and second edge profiles so that the magnetic force from the at least one first magnet on the at least one magnetic component secures the panels together at a joint of the display case.

According to another aspect, a display case can include a first panel that defines a first viewing area of the display case, and a second panel that defines a second viewing area of the display case. A first magnetic assembly can support a first magnetic component (e.g., a first magnet or a first ferrous component) at first edge of the first panel. A second magnetic assembly can support a second magnetic component (e.g., a second magnet or a second ferrous component) at a second edge of the second panel. The first and second magnetic assemblies can be magnetically secured together by the first and second magnetic components to secure the first and second panels together at a corner joint of the display case.

According to another aspect, a display case can include a first panel and a second panel, each including an upper region, a medial region, and a lower region, a top inner extrusion, an inner base extrusion including a first protruding flange, and a corner assembly including a first (e.g., magnet) corner extrusion secured to the first panel and a second (e.g., magnet keeper) corner extrusion secured to the second panel. The first corner extrusion can define a pocket that contains at least one first magnet and the second corner extrusion can define a pocket that contains at least one magnetic component that includes one or more of: at least one second magnet or at least one magnet keeper. The corner assembly can cooperate with the top inner extrusion to form an upper periphery and can cooperate with the inner base extrusion to form a lower periphery, wherein the at least one first magnet and the at least one magnetic component cooperate to secure the first corner extrusion to the second corner extrusion to thereby secure the first panel to the second panel at the corner assembly. The upper region of the first panel can be received into an upper cavity formed by the upper periphery, and the lower region of the first panel can sit on the first protruding flange of the inner base extrusion.

According to another aspect, a process of assembling a display case can include, with a first panel pre-assembled to a first corner extrusion and with a second panel pre-assembled to a second corner extrusion, assembling the first corner extrusion and the second corner extrusion to form a corner joint of the display case, wherein a magnetic engagement between the first and second corner extrusions holds the first and second panels together at the corner joint.

According to another aspect, a process of disassembling a display case can include, with a first panel received in a top channel of the display case and seated on a base shelf of the display case, releasing one or more threaded fasteners that secure the first panel to the display case via an edge piece that receives an edge of the first panel, so that the first panel remains secured to the display case via magnetic engagement of the edge piece. Without removing the edge piece from the first panel, moving the first panel off of the base shelf and then moving the first panel downward and outward, relative to the display case, to remove the first panel from the top channel and magnetically disengage the panel from the display case.

According to another aspect, a process for a display case can include assembling the display case by aligning a first panel with a second panel, and magnetically securing a first magnetic assembly at a first edge of the first panel to a second magnetic assembly at a second edge of the second panel to secure the first and second panels together at a joint (e.g., corner joint) of the display case. The first panel can define a first viewing area of the display case and the second panel can define a second viewing area of the display case. The first magnetic assembly can support a first magnetic component (e.g., a first magnet or a first ferrous component) and the second magnetic assembly can support a second magnetic component (e.g., a second magnet or a second ferrous component) to magnetically engage the first magnetic component.

BRIEF DESCRIPTION OF THE DRAWINGS

FIG. 8 is an isometric view of a different embodiment of a display case with additional panels;

FIG. 9 is an isometric exploded view of the display case of FIG. 8, with certain components removed for clarity of presentation;

DETAILED DESCRIPTION

Figure 1:
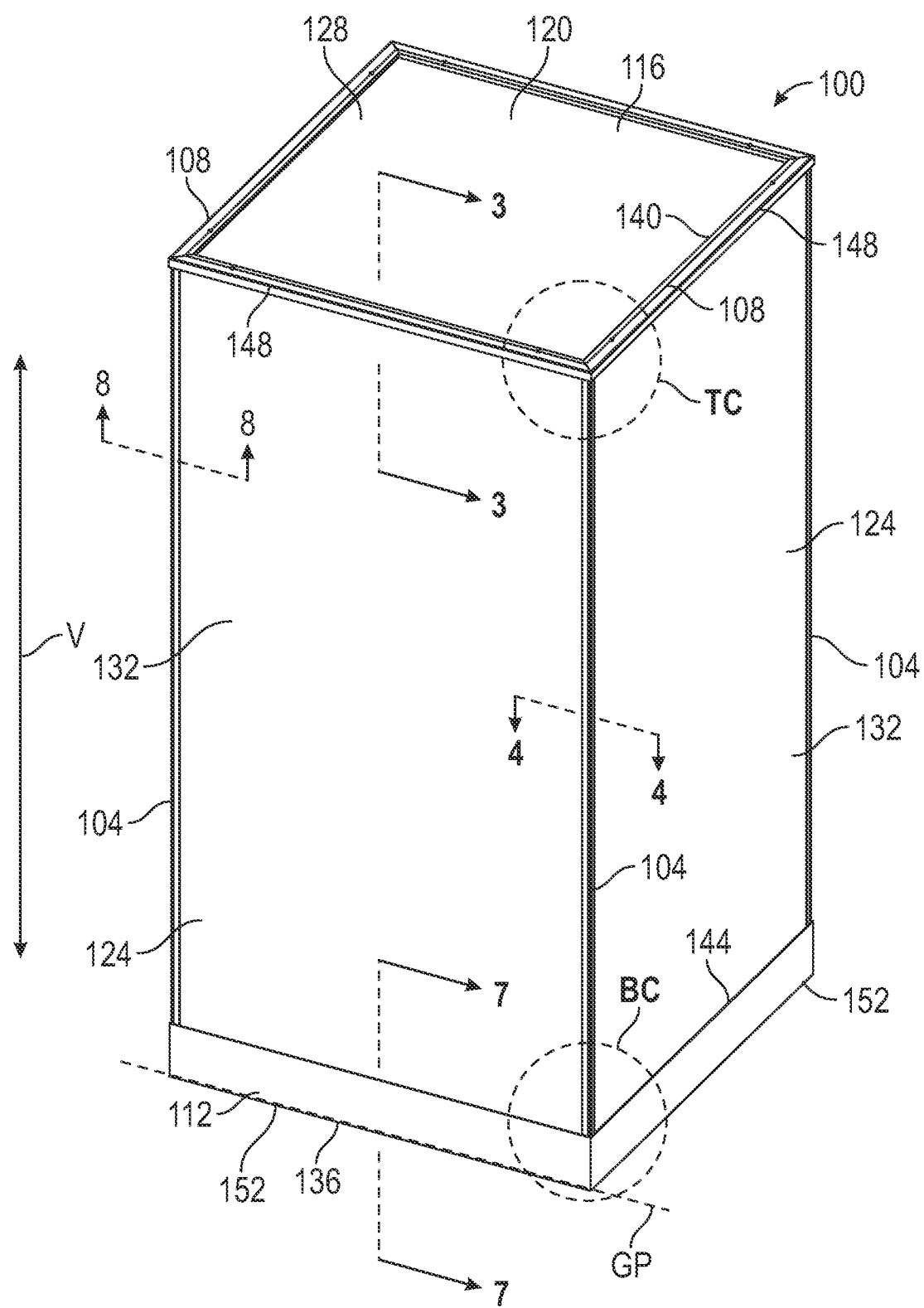
FIG. 1 is a top, front, right isometric view of a display case having a plurality of panels and frame members.

In general, display cases may include transparent or translucent (or other) panels that are coupled to a framework formed from various frame members. The framework provides support to the plurality of panels that holds the plurality of panels together in place to enclose a three-dimensional interior display space (e.g., to display a showcase object). In many cases, transparent panels for display cases can be made from glass or acrylic, although other materials are possible (e.g., other transparent or translucent composite materials known in the art). Depending on the showcase object that is being displayed, different types of display cases may be used to define particular viewing areas of the display case through which a display can be observed (e.g., with different numbers or sizes of panels). In some cases, a display case may include conservational and environment control functions (e.g., airtight sealing, temperature control, humidity control), security functions (e.g., security alarms), enhanced optical functions, or other features.

Conventional display cases are typically built-in display cases or free-standing display cases. Built-in display cases may be built into various structures (e.g., mounted to a room wall, or built as room partitions). Free-standing display cases may generally be self-supporting rather than built into other structures, and can be formed in various configurations (e.g., as mannequin, tower, or pedestal cases), Some display cases can be built to display an object from all sides (e.g., except from below), whereas others can be built or positioned to display an object only from select sides (e.g., from three or fewer sides for wall display cases).

Display cases can conventionally be manufactured in variety of shapes, styles, and materials depending on the purpose of the display cases. Some conventional display cases are manufactured by specializing companies and are customized to meet the demands of the showcase object. For example, conservational grade cases include tightly controlled environment that is free from chemical pollutants. After the components constituting the display cases are manufactured, the display cases may be shipped pre-assembled or may be assembled after shipping. The shipping of pre-assembled display cases may pose logistic difficulties (e.g., more expensive, requires large shipping area), handling difficulties (e.g., heavy machineries involved to transport the pre-assembled display case), and may pose fitting problems (e.g., fitting through tight spaces, doors, corridors of the exhibition site). To alleviate the difficulties posed by pre-assembled display cases, display cases can be sent in a ready-to-assemble configuration with instructions, or a technician may be sent to the exhibition site to orchestrate the assembly process.

Generally, assembling and disassembling a large display case can be difficult due to the size and the weight of the panels, the size and the weight of the framework, and the limited fitting space around the intended location of installation. Some obstacles may be overcome by the use of particular materials. For example, traditionally, glass was the most prevalent material used for fabricated display cases. However, glass sheets can be expensive, brittle, and heavy, can require long lead time, and can require a lot of labor force and preparation time to install the corresponding display case(s). To overcome the limitation presented by glass, acrylic (or other composite) sheets can be used. The acrylic sheets are typically less expensive, requires shorter lead time, and weigh about 50% less than equivalent glass sheets.

Even with improved material usage, the limited space around the intended location of installation can be a substantial impediment to efficient assembly and disassembly of large display cases. For example, conventional display cases require the vitrine to be slid out of engagement from the associated base to gain access to the internal display area of the display case. Accordingly, conventional designs can require unobstructed overhead space more than twice the height of a vitrine. Further, conventional designs may require glass lifting equipment, such as a telehandler or a crane, to lift the vitrine for removal or to carry the removed vitrine to a desired location.

To overcome these limitations or otherwise provide improved functionality, stability, durability, etc., embodiments of the present disclosure provides a free-standing display case with a framework and a plurality of display panels. In some cases, the framework can include a corner or other joint assembly (e.g., an of aluminum or other corner extrusions) that can magnetically secure panels in an installed configuration (e.g., to be further secured with threaded fasteners). For example, a corner assembly can include a magnet corner extrusion and a keeper corner extrusion that include complementary arrangements of one or more magnets (e.g., rare earth or other strong magnets) and one or more ferrous members (e.g., iron bars) arranged in a collectively formed pocket between the magnet corner extrusion and the keeper corner extrusion. In some examples, similar arrangements can include magnets (e.g., rare earth magnets) on both sides of a joint assembly for a display case. For example, a first corner extrusion can hold a first set of magnets and a second corner extrusion can hold a second set of magnets, collectively arranged to be complementary relative to polarity and location so that magnets of one extrusion cooperatively magnetically engage with magnets of the other extrusion to hold the extrusions together.

In some examples, select frame members (e.g., on an inner framework) of a framework for a display case can define a support shelf and a channel. The channel can slidingly receive a panel assembly to provide lateral engagement of the panel assembly and the shelf can provide vertical support for the panel assembly. Thus, for example, during installation, a top surface of the display panel can be inserted into the channel and the bottom surface of the display panel can be supported on the shelf, and uninstallation of the display panel can include moving the display panel off of the shelf and sliding the panel downward out of the channel. Thus, for example, the panel assembly can be installed or uninstalled without needing to remove edge members from the panel or needing to lift the panel assembly to extend substantially above the top of the display case.

Referring now to FIG. 1, an example display case 100 is shown in accordance with the present disclosure. Although the display case 100 is a free-standing type display case, the principles disclosed herein can also be employed in other arrangements. In particular, the display case 100 includes a plurality of corner (edge) frame assemblies 104 (e.g., with frame members formed as extrusions), a plurality of transparent panels 120, 124 (etc.), a plurality of outer upper covers 108 (e.g., also formed as extrusions), and a plurality of outer lower covers 112 (e.g., also formed as extrusions), which may be coupled to one another after the machining process of each individual parts to provide a prism-shaped display case with an enclosed interior display area. Although the display case 100 as shown includes transparent acrylic panels in particular, one or more panels for the case 100 or other cases discussed herein can be alternatively formed with other types or materials or levels of transparency. For example, different materials (e.g., glass, composites) can be used or certain panels may be opaque or translucent instead of being transparent.

The free-standing type display case 100 defines an upper face 128, a bottom end 136, and side faces 132 defined between the upper face 128 and the bottom end 136 along a vertical direction V, perpendicular to a ground plane GP. The upper face 128 and the side face 132 form an upper periphery 140 and the bottom end 136 and the side faces 132 form a lower periphery 144. The side faces 132 of the display case 100 may be defined by the corner assemblies 104 and by the side panels 124 along the vertical direction V. The upper face 128 of the display case 100 may be defined by the upper covers 108 and by the top panel 120. The lower face 136 of the display case 100 may be defined by the lower covers 112. The upper periphery 140 includes upper edges 148 that meet to define a top corner (vertex) TC. The lower periphery 144 includes lower edges 152 that meet to define a bottom corner (vertex) BC.

Generally, the panels 120, 124 can be transparent (e.g., fully transparent) and may be tooled along the edges and along the side thereof (e.g., particularly in the case of acrylic or other composite panels). Additional treating of acrylic or other panels may be applied to enhance light transmittance and transparency. In some implementations, ASTM standard D1003 20221 Edition (Standard Test Method for Haze and Luminous Transmittance of Transparent Plastics) may be used to measure the visible light transmissivity and, thus, relative transparency/translucency/opaqueness of the herein-described materials. Further, it is intended that the suggested testing protocols be followed for the particular material being reviewed and that if Procedure A, which utilizes a hazemeter, or Procedure B, which used a spectrophotometer, provide for different visible light transmission results/percentages, that the higher value of the two procedures be used for purposes of the present disclosure. It is also contemplated that if a subject material to be considered for purposes of this disclosure has a non-planar configuration, e.g., a groove, that a planar portion of the particular material be used for testing purposes.

Alternatively, ASTM standard D1746 2021 Edition (Standard Test Method for Transparency of Plastic Sheeting) may be used to measure opacity and, thus, the relative transparency/translucency/opaqueness of the herein-described materials, with suitable standardized equipment, such as an opacity meter. As used herein, the term "opacity" refers to the extent to which a surface, an object, or a layer of material impedes the transmission of light through it and, thus, is the inverse of the visible light transmissivity measurement referenced herein. It is contemplated that opacity and visible light transmissivity may be used interchangeably and that measurements according to either ASTM D1003 or ASTM D1746 may be used; however, for purposes of this disclosure, the measurements of visible light transmissivity according to ASTM D1003 protocols are preferred.

Figure 2:
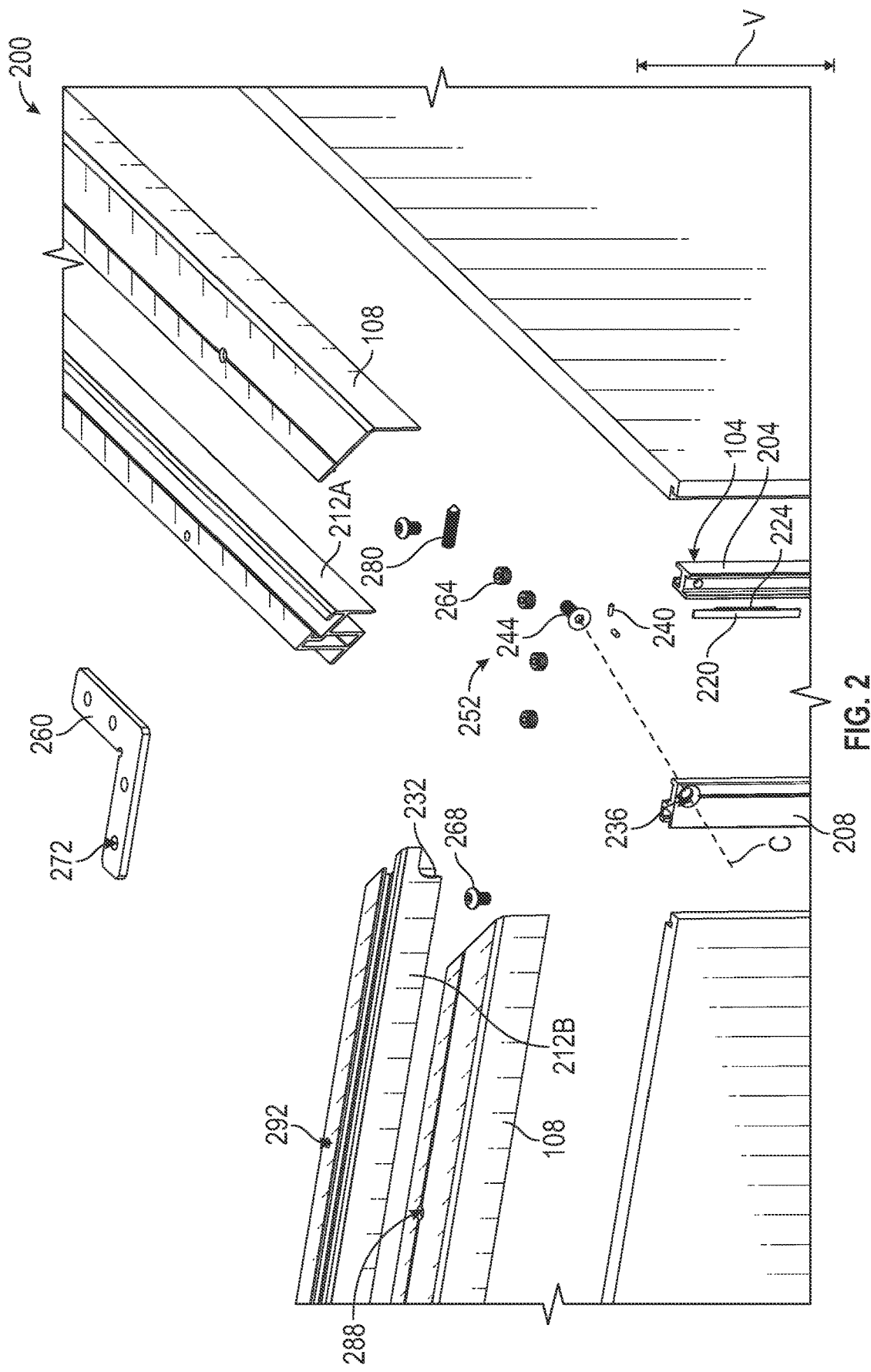
FIG. 2 is an exploded, isometric view of a top corner (vertex) assembly of the display case of FIG. 1.

Referring now to FIG. 2, top corner (vertex) assembly 200 of the display case 100 is shown, as formed by the corner assembly 104 and adjacent top frame members (as further discussed below). In particular, the corner assembly 104 includes corner extrusions 204, 208, that can be magnetically secured together to define a corner (edge) of the display case 100. For example, the corner extrusion 204 can include one or more magnets 220 arrayed along the vertical direction V, and the corner extrusion 208 can include a plurality of magnet keepers 224 (e.g., ferrous plates as shown, or other magnetic components) along the vertical direction V. In other examples, both of the corner extrusions 204, 208 (or others) can include complimentarily arranged magnets or magnet keepers Thus, unlike conventional assemblies that rely exclusively on threaded fasteners, the corner assembly 200 can be secured together using magnets, including during staging of the various panels during an installation process. For example, the magnets 220 located within the corner extrusion 204 (or other first-edge magnetic assembly) and the magnet keeper 224 within the corner extrusion 208 (or other second-edge magnetic assembly) are attracted by a magnetic force. The magnetic force generated between the magnet 220 and the magnet keeper 224 is strong enough to hold the corner extrusions 204, 208 together as needed.

In some embodiments, the magnet 220 may be fastened internally to the magnet corner extrusion 204 using a fastening mechanism, such as, but not limited to a dowel pin 240 or a threaded fastener. In some embodiments, the magnet 220 and the magnet keeper 224 may be secured using an adhesive or other known retention mechanism. In some embodiments, to maximize the magnetic force between the magnet 220 and the magnet keeper 224, a zinc plating finish or a galvanizing finish may be induced to the surface of the magnet keeper 224.

In some examples, corner members can also be secured together non-magnetically. For example, the corner extrusions 204, 208 can also be coupled using a variety of fasteners, adhesives, etc., to supplement (or replace) a magnetic engagement. For example, in the present disclosure, a hexalobular screw 244 can be fastened through a countersink aperture 236 formed on the magnetic keeper extrusion 208 to couple the corner extrusion 204 and the corner extrusion 208 to supplement the holding force and security of the magnetic engagement. However, the magnetic engagement of the magnetic components 220, 224 can be generally strong enough to hold the corner assembly 104 together during installation, without requiring additional (e.g., manual) intervention from installers.

To further define the volume of the display case 100, the corner assembly 104 can be coupled with top frame members perpendicular to the vertical direction V. For example, in the illustrated example, the corner assembly 104 can be secured to top frame members formed as extrusions 212A, 212B. The extrusions 212A, 212B can be generally similar, and are also referred to collectively herein as extrusions 212. As shown in FIG. 2, an end of one of the extrusions 212B can include an edge cut-out 232 that can be aligned, as assembled, along a centerline C with the countersink aperture 236 to provide clearance for the fastener 244. The top extrusions 212 can be coupled with the corner assembly 104 by a bracket plate 260 (e.g., a L-shape bracket as shown) or otherwise. In particular, in the illustrated example, the bracket plate 260 includes a plurality of apertures 272 that are equally spaced along the bracket plate 260 to receive fasteners to secure the bracket plate 260 to the extrusions 212. In the present disclosure, cone point (or other) screws 264 can be used to secure the bracket plate 260 with the corner assembly 104, although other configurations are possible.

Thus, the assembly of the corner assembly 104 and the top extrusions 212 can form an inner framework 252. As further discussed below, the inner framework 252 may receive the side panels 124 in cooperation with the corner assemblies 104. In some examples, the panels 124 may also be secured to the extrusions 212 by one or more fasteners (e.g., a cup point screw 280).

Still with reference to FIGS. 1 and 2, the outer covers 108 can be coupled with the inner extrusions 212 of the inner framework 252. Thus, the covers 108 may conceal fasteners or other features located along the upper face 128 or around the upper periphery 140 of the display case 100. The covers 108, for example, can be fastened using a security screw 268 extended through a first aperture 288 located on a top flange of the cover 108 and a second aperture 292 located on a top flange of the corresponding extrusion 212. In some embodiments, the outer upper cover 108 may be fastened using a customized fastener to provide extra security. Of note, with the cover 108 in place (or with other covers disclosed herein), the screws 244 and others that secure the corner assembly 104 (or other joint assembly) may be fully hidden from view, from the perspective of an observer on the ground outside the display case 100. This may provide further security for the case 100 generally (or other cases), including by deterring opportunistic attempts to disassemble the case 100 to access the interior space.

Figure 3A:
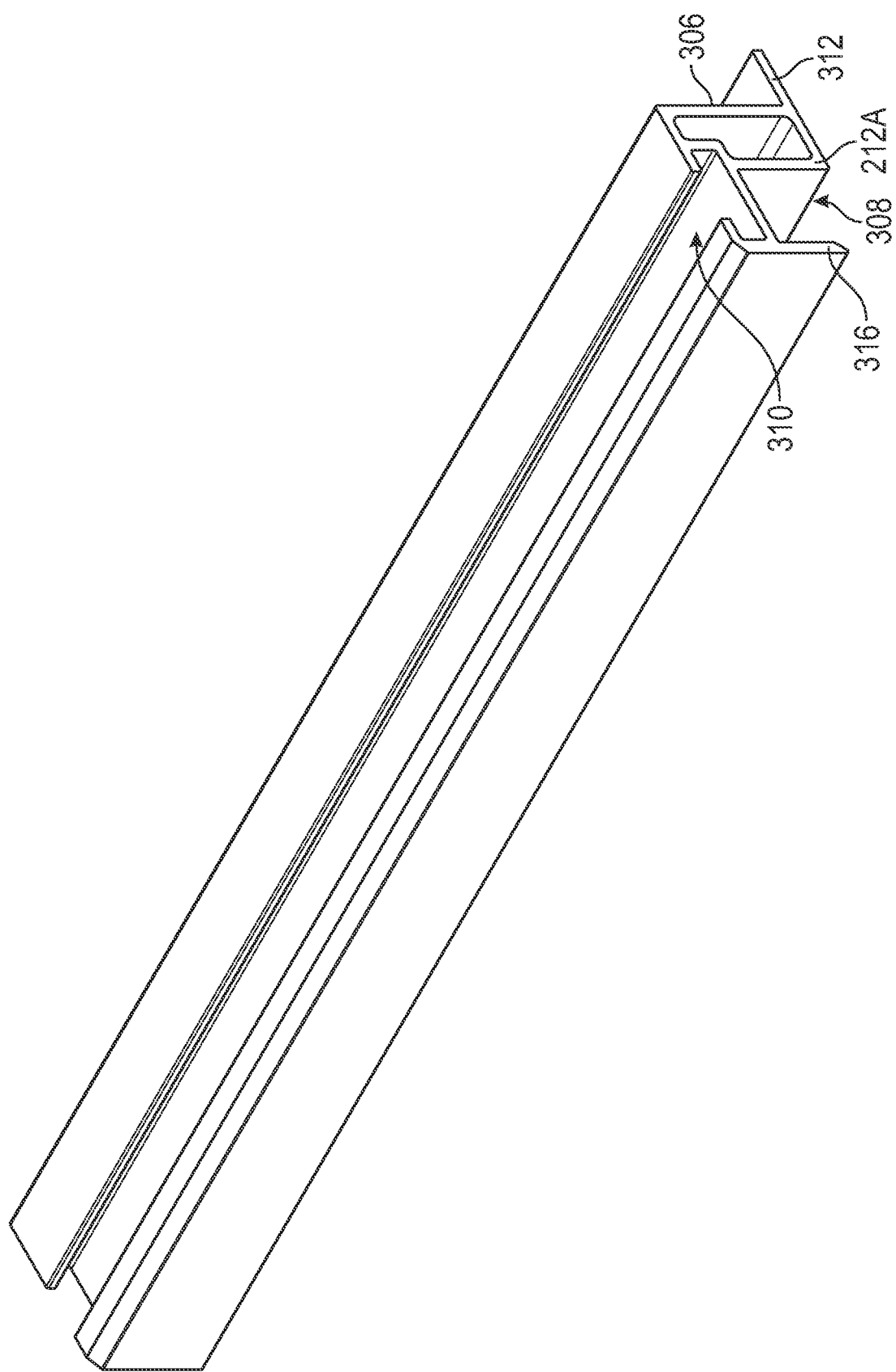
FIG. 3A is an isometric view of a top frame member of the display case of FIG. 1 for the top corner assembly.
Figure 3B:
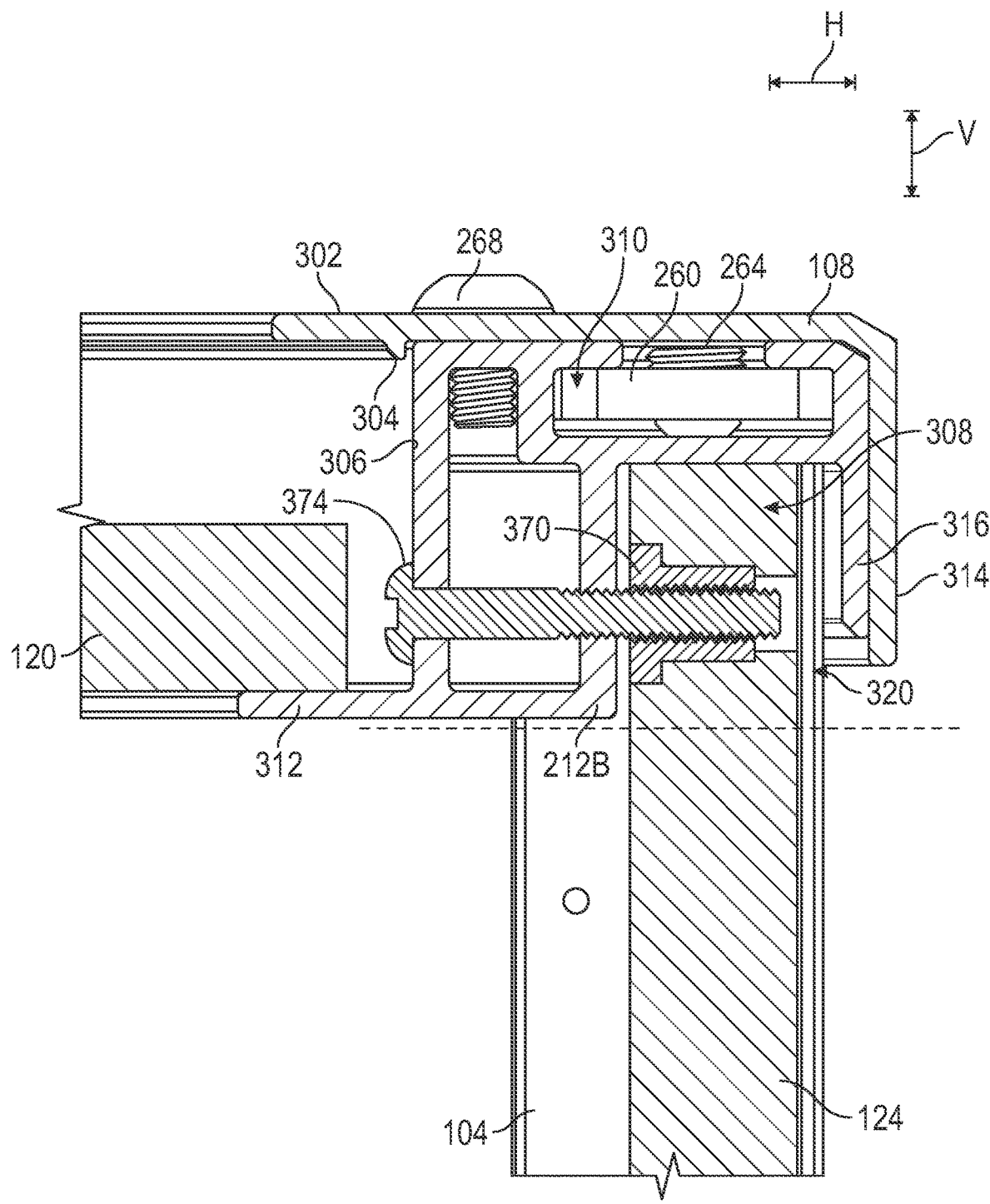
FIG. 3B is a cross-sectional partial view of the top corner assembly of FIG. 2, taken along the line 3-3 of FIG. 1.

Referring to FIGS. 3A and 3B, the extrusions 212 generally include a lower cavity 308 (e.g., formed as an elongate channel), an upper cavity 310 (e.g., formed as an elongate channel), a horizontal flange 312, and a vertical flange 316, as well as other supporting structure. The extrusion 212 can be secured to the corner assembly 104 via insertion of the bracket plate 260 into the upper cavity 310, to be retained by the lips of the cavity 310, and engagement of the screws 268 to secure the covers 108 in place over the cavity 310. The horizontal flange 312 thus extends laterally inwardly to support the top panel 120 along the horizontal direction H. Further, the vertical flange 316 is thus aligned to support the upper region 320 of the corresponding side panel 124 along the vertical direction V. Jointly with the corner assembly 104, the cavity 310 (and the vertical flange 316) can thus hold the side panel 124 in place. For example, in some mounting procedures, as further discussed below, the side panels 124 may be inserted into the cavity 308 to help align the panels 124 for installed engagement.

In different examples, different cover profiles are possible. In the illustrated example, as shown in FIG. 3B, the outer upper cover 108 includes an outer side surface 314 and an upper surface 302. The outer side surface 314 extends parallel to the vertical direction V and the upper surface 302 extends parallel to the horizontal direction H. The upper surface 302 of the outer upper cover 108 is parallel with the horizontal flange 312 of the top inner extrusion 212 and includes a protrusion 304 extruding downwardly along the vertical direction from the upper surface 302 of the outer upper cover 108. The protrusion 304 can help installers to appropriately locate the cover 108 relative to the extrusion 212, via engagement with an inner surface 306 of the extrusion 212, and also help to keep the cover 108 in place during installation of the screw 268. Further, the extended length of the upper surface 302 in the inward direction can help to prevent removal of the panel 120 prior to removal of all of the screws 268 and the covers 108. The outer side surface 314 extends parallel to the vertical flange 316 of the top inner extrusion 212. In particular, in some examples, the outer side surface 314 of the outer upper cover 108 extends further than the vertical flange 316 of the top inner extrusion 212.

As also shown in FIG. 3B, in some cases, threaded inserts 370 or other threaded profiles in the panel 124 can receive screws 374 inserted from inside the display case 100 to further secure the panel to the extrusions 212 (or other frame members). Thus, during installation of a panel (e.g., as also discussed with respect to FIGS. 13 and 18A-19B), the panel can be secured at select locations along a relevant horizontal frame member, as well as at the relevant corner joints. Moreover, the internal access required for the screw(s) 374 can provide even greater security against unauthorized access to the display case 100. For example, to remove the panel 124, a user may thus be required to remove the screws 268 and the cover 108, then remove the screw(s) 374. For security, the screws 374 and the inserts 370 in combination can prevents the removal of the top frame altogether. These components can also provide alignment of the panels relative to the frames to help ensure proper alignment with the magnetically engaged accessible panels.

Figure 4:
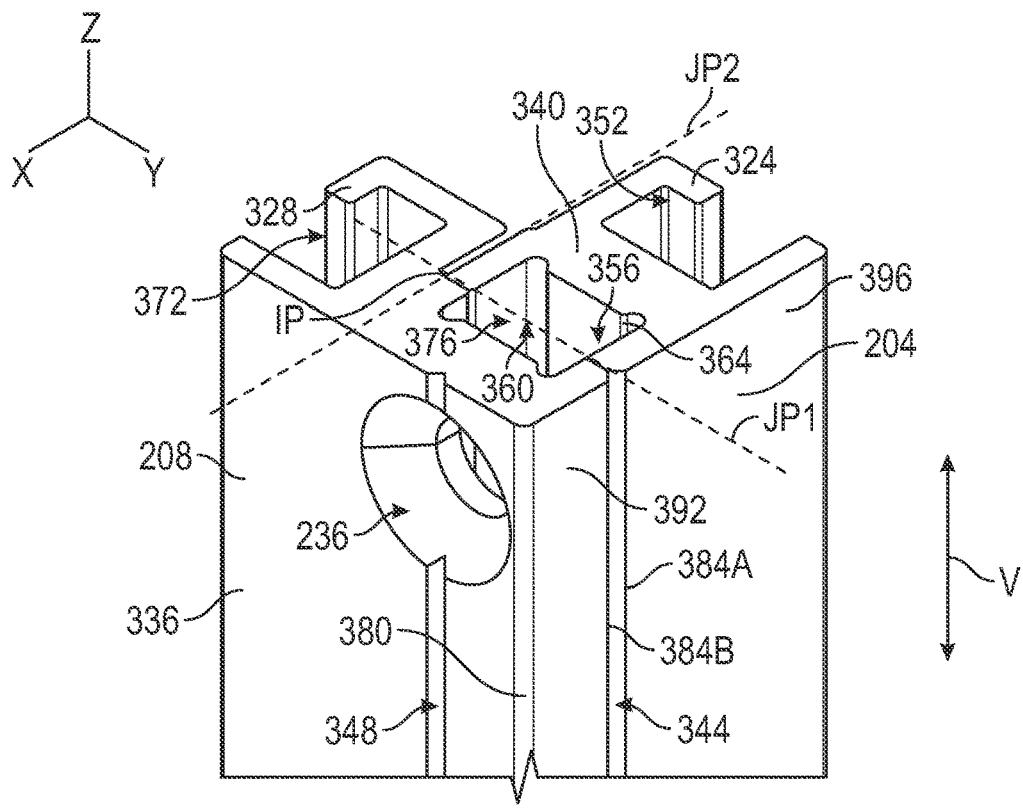
FIG. 4 is an isometric partial view of a corner (edge) joint assembly of the display case of FIG. 1.
Figure 5:
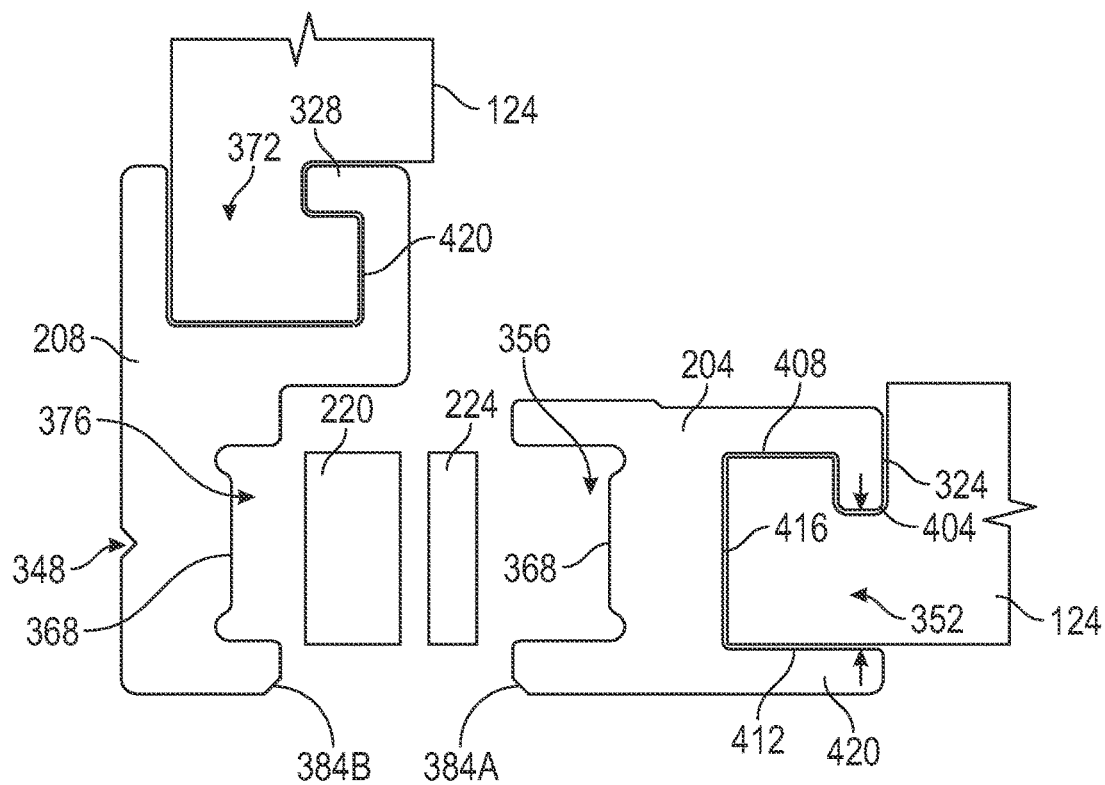
FIG. 5 is a top plan exploded view of the corner joint assembly of FIG. 4.

Referring to FIGS. 4 and 5, details of the (edge) corner assembly 104 are shown in accordance with one example of the present disclosure. As mentioned above, the corner assembly 104 includes the corner extrusion 204 and the corner extrusion 208. The extrusions 204, 208 of the corner assembly 104 are joined along a part line that defines first joining plane JP1 which extends parallel with the Y-direction Y and a second joining plane JP2 which extends parallel with the X-direction X. The first joining plane JP1 and the second joining plane JP2 intersect each other at an intersection point IP. In other words, the part line at the corner joint defined by the assembly 104 extends inward to intersect a wall of one of the extrusions 204, 208 (e.g., at a wall that defines a channel to receive the corresponding panel, as shown). Similarly, the part line at the corner joint also extends outward to intersect a wall of the other of the extrusions 204, 2048 (e.g., at a thickened portion of the wall that receives the corresponding magnetic component, as shown). Through these arrangements, alone or in combination with other relevant features (e.g., as further discussed below), the corner joint can exhibit notable strength as well as improved security relative to conventional designs.

In the illustrated example, the corner extrusion 204 includes a web 340, and a plurality of flanges extending outwardly in both directions from the web 340 to form a generally I-shaped profile. In some embodiments, the web 340 may include plurality of apertures (not shown) to receive fasteners (e.g., to secure the extrusions 204, 208 together). The corner extrusion 204 also includes an outer vertical channel 352 and an inner vertical channel 356 defined by the web 340 and the plurality of flanges. The outer vertical channel 352 in particular is further defined by a protruding flange 324, that extends along the Y-direction (according to the reference frame of FIG. 4) to define a narrowed opening into the channel 352 along the extrusion 204 and thus a hooked or generally J-shaped profile for the channel 352 overall. This arrangement, for example, can allow for easy but secure sliding engagement with a complementarily shaped edge of a panel.

In some embodiments, the protruding flange 324 may extend up to 33% of the thickness of the panel (not shown in FIG. 4). In some embodiments, the protruding flange may extend up to 50% of the thickness of the panel (not shown in FIG. 4). On an opposite, external side of the extrusion 204, a first fillet 384A can be formed adjacent to the inner vertical channel 356, extending inwardly from an outer face 396 of the extrusion 204. The inner vertical channel 356 can include grooves (e.g., one or more U-shaped grooves 364) extending along the vertical direction V, which can receive a bead of adhesive to help ensure that relevant magnetic components are firmly secured in place as desired (e.g., to remedy potential issues with adhesive engagement between the potentially sharp-cornered magnetic components and the potentially rounded-corner extrusions, etc.).

In contrast to the extrusion 204, the extrusion 208 in the present example exhibits a lower case y-profile, although other configurations are also possible. In particular, the extrusion 208 defines an outer vertical channel 372, and an inner vertical channel 376, which are formed integrally along a first outer surface 336 that is parallel to the first joining plane JP1. The outer surface 336 includes the countersink aperture 236, and a relief groove 348 that extends along the vertical direction V. Similarly to the channel 352, the channel 372 includes a protruding flange 328 that extends along the X-direction (as shown in FIG. 4). Thus, similarly to the channel 352, the channel 372 defines a hooked or generally J-shaped profile that can allow for easy but secure sliding engagement with a complementarily shaped edge of a panel. However, in other examples, other profiles are possible (e.g., with correspondingly complementary profiles on relevant panels).

In some embodiments, the protruding flange 328 may extend up to 33% of the thickness of the panel (not shown in FIG. 4). In some embodiments, the protruding flange 328 may extend up to 50% of the thickness of the panel (not shown in FIG. 4). The medial vertical channel 376 can include U-shaped or other grooves similar to the channel 356 (see above), and The outer surface 336 can include a second fillet 384B.

As noted above, the magnet corner extrusion 204 and the magnet keeper extrusion 208 are coupled together along a part line that defines the first joining plane JP1 and the second joining plane JP2. The first joining plane JP1 is located between the first fillet 384A and the second fillet 384B or an outer face 392 of the extrusion 208 and the outer face 396 of the extrusion 204. The fillets 384A, 384B can thus be arranged to collectively form a second relief groove 344, as shown in FIG. 4. Further, the combined length of the outer faces 392, 396 in the X direction can be equal to the length of the outer face 336 in the Y direction. Thus, for example, the corner assembly 104 can be generally visually symmetrical, and the relief grooves 344, 348 can be formed equidistant from a corner edge 380.

Further, the coupling of the extrusions 204, 208 aligns the channels 356, 376 to form an internal pocket 360. In some embodiments, the pocket 360 may enclose the magnet 220 and the magnet keeper 224, for example, with the magnet 220 or the magnet keeper 224 at least partially in contact with an inner surface 368 of the pocket 360 (see FIG. 5). Thus, as further discussed below, the extrusions 204, 208 can be magnetically secured together to form the corner assembly 104.

Referring to FIG. 5, in particular, the channels 352, 372 can be identical in size and shape and thus can interchangeably engage any panel formed with a corresponding edge profile. In the illustrated example, the vertical channel 352 (like the channel 372) includes an opening 404, an innermost receiving surface 408, a medial receiving surface 416, an outermost receiving surface 412 and the protruding flange 324 (or 328). These features thus collectively form an internal profile 420 of the vertical channels 352, 372 that can receive and engage a corresponding edge of the side panels 124. In some embodiments, the vertically extending side (not shown) of the panels may be machined or otherwise formed to fit the internal profile 420 of the vertical passages. For example, in the present disclosure, the vertically extending side of the side panels may be a J-shape profile machined into an acrylic or other composite panel. In other examples, other configurations are possible.

Referring back to FIG. 4, the unique shape of the magnet corner extrusion 204 (e.g., the magnet keeper extrusion 208 wrapping around the corner edge 380 in addition to the first relief groove 344 and the second relief groove 348) can provide several benefits over a typical framework of a display case. Typically, a break line of a display case is formed at a corner edge of the case, which can make the display case more susceptible to gapping, visually highlight the break lines, and result in less than optimal security. In contrast, the magnet keeper extrusion 208 comprises the first relief groove 344 and the magnet corner extrusion 204 comprises the second relief groove 348 formed reciprocally with the magnet keeper extrusion 208, mimicking the break line. The first relief groove 344 can thus camouflage the actual break line between first fillet siding 384 and the second fillet siding 388. The configuration of the present disclosure also relocates the break line to be offset from the corner edge of the display case, which can make the break line less visible, help to reduce the gap caused by the panel alignments, and align an insertion direction (e.g., along the plan JP1) with a solid wall of at least one of the extrusions 204, 208 so that an inserted tool (e.g., a prying tool) cannot easily enter the interior display space of the display case. (In this regard, it should be understood that a corner edge of a display case can exhibit various geometries, including machined or extruded radiused profiles (e.g., as shown in FIG. 4), chamfered profiles, or other varied profiles available under known manufacturing approaches.)

Referring also to FIG. 2, the magnet 220 and the magnet keeper 224 of the present disclosure is positioned within the pocket 360 formed internally between the magnet corner extrusion 204 and the magnet keeper extrusion 208. In some embodiments, the magnet 220 may be made from neodymium or alloys of neodymium, iron or boron. The magnets 220 may be of various lengths and can be spaced evenly (or otherwise) within the vertically extending pocket 360. The magnets are generally strong enough to hold the corner extrusion assembly 104 together in place without the fasteners in place, as can substantially improve staging during installation. In addition, the magnet provides self-alignment assistance between the magnet corner extrusion 204 and the magnet keeper extrusion 208 during the assembly process. However, the screws can be added to provide additional support and security to the overall structure.

As also shown in FIG. 5, the magnet keeper 224 (or other magnetic component) and the channel 376 can be sized (or installed) so that the magnet keeper 224 (or other component) extends proud of the extrusion 208 along the channel 376. In contrast, the magnet 220 (or other magnetic component) and the channel 356 can be sized (or installed) so that the magnet 220 (or other component) is recessed within the channel 356. Accordingly, in some examples, a magnetic component on a first corner member (e.g., the magnet keeper 224 on the extrusion 208) can extend into a channel on another corner member (e.g., the extrusion 204) to mechanically align the corner members together as well as provide a magnetic connection. In some examples, as also discussed below, other alignment members can be used.

Figure 6:
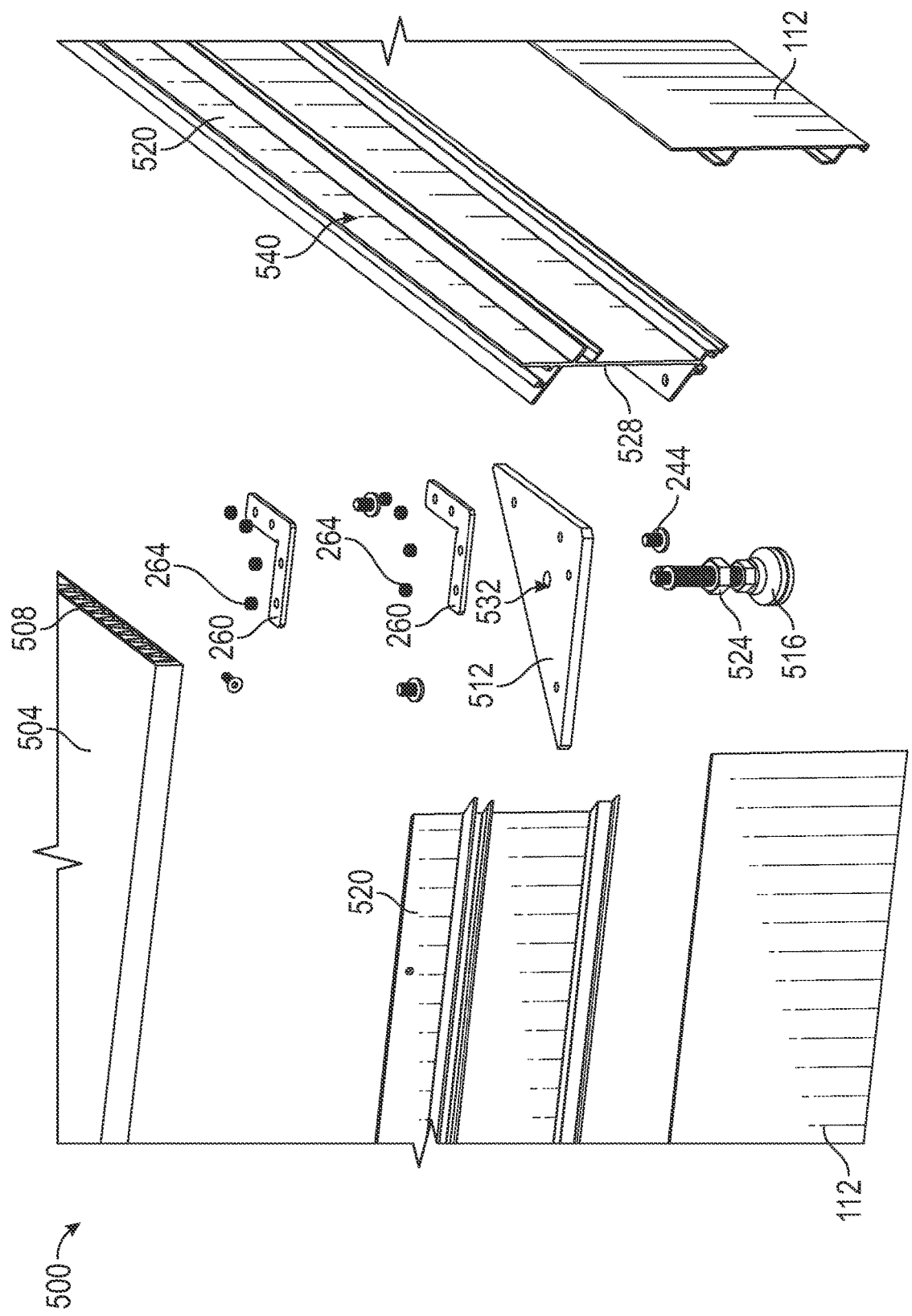
FIG. 6 is an exploded, isometric partial view of a bottom corner (vertex) assembly of the display case of FIG. 1.

Referring to FIG. 6, an exploded view of a bottom (vertex) corner 500 of the display case 100 of the present disclosure is shown. The bottom corner 500 of the display case 100 includes a floor plate 504, a foot plate, 512, a swiveling leveling mount 516, an adjusting nut 524, a set of inner base extrusions 520, another set of bracket plates 260, variety of fasteners, and the outer lower cover 112. Similar to the top inner extrusion 212, the inner base extrusions 520 are coupled together by coupling with the corner extrusion assembly 104, and thus discussion of the upper corner 200 as shown in FIGS. 2 and 3 generally also applies relative to the bottom corner 500. For example, in some embodiments, two of the bracket plates 260 and plurality of cone point (or other) screws 264 may be used to secure the inner base extrusions 520 together along the edge 528 of the inner base extrusion 520. (Generally, different types of screws may be used instead of the cone point screws 264, as is generally true for other example threaded fasteners presented herein.)

The inner base extrusions 520 include multiple protruding members that can help to secure the floor plate 504, the foot plate 512, and the outer lower covers 112. In some embodiments, the floor plate 504 includes a lattice structure 508 formed between the upper surface and the lower surface of the floor plate 504. The lattice structure 508 within the floor plate 504 provides a lightweight structure and rigidity to the floor plate 504. The floor plate is secured by the inner upper protrusion within the inner base extrusion 520. The foot plate 512 is secured to the inner lower protrusion with a fastening mechanism such as a hexalobular (six-lobe) screw 244 (e.g., also with a central security post to require a further specialized driver), to the inner base extrusion 520. The foot plate 512 includes a foot plate aperture 532, which receives the swiveling level mount 516. The outer lower covers 112 are secured to plurality of protrusions extruding outwardly from the inner base extrusion 520, as further described below. The inner base extrusion 520 can also include plurality of apertures 540 arranged to pin the panels 124 (not shown in FIG. 6) to secure the panels 124 to the extrusions 520 (as needed).

Figure 7:
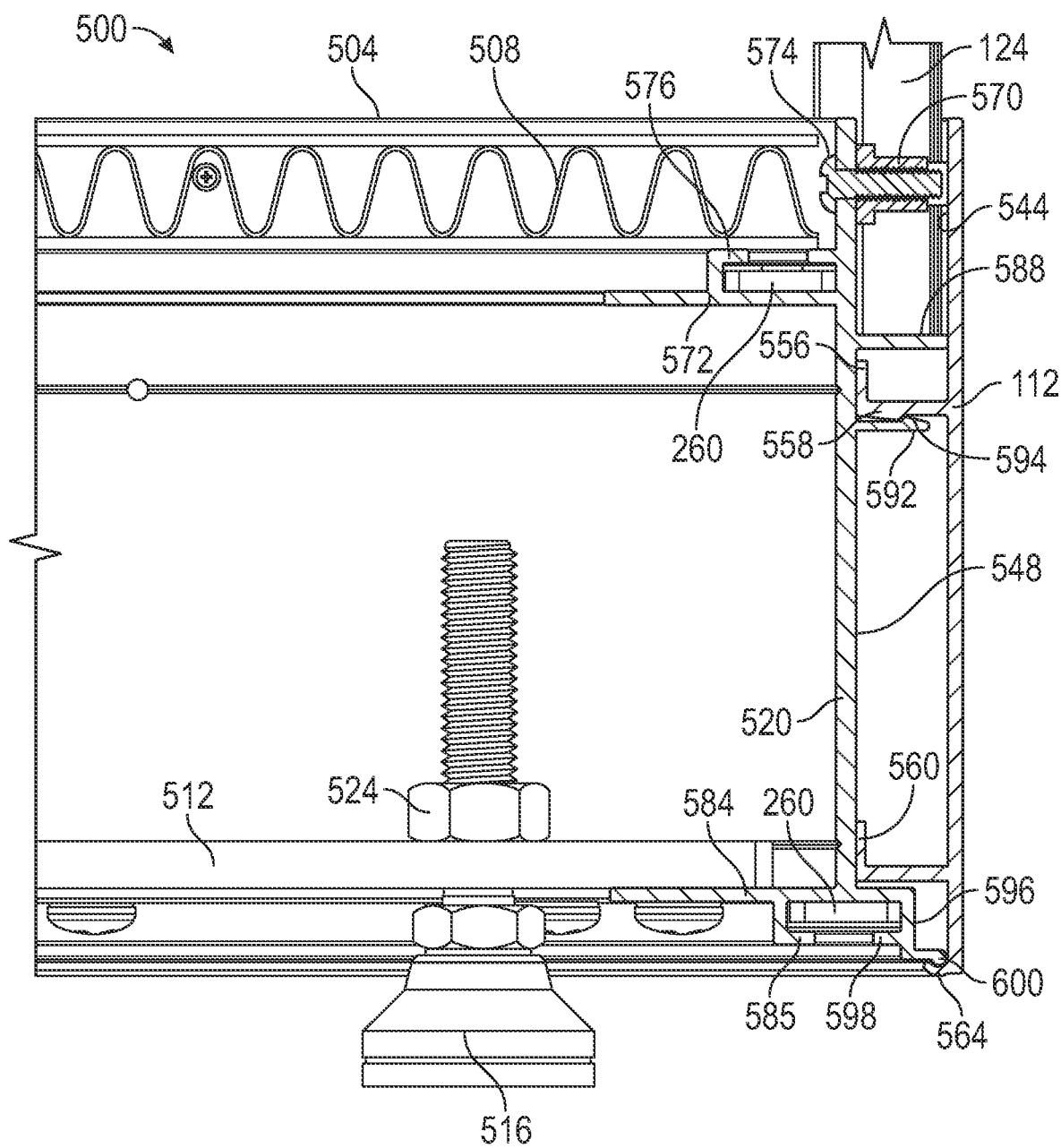
FIG. 7 is a cross-sectional partial view of the corner extrusion assembly of FIG. 6 taken along the line 7-7 of FIG. 1.

Referring to FIG. 7, the outer lower cover 112 includes a plurality of flanges extruding in an inward direction IN along the horizontal direction H. The first flange is an upper flange 556, which exhibits an L-shape. The upper flange 556 includes a protrusion 558 that extends in the opposite direction from the free end of the L-shape, along the web of the upper flange 556. The second flange is a medial flange 560, which also exhibits an L-shape. The third flange is a lower flange 564, which generally extends in a single direction but includes a hooked portion (e.g., a C-shaped or otherwise hooked free end, as shown).

As described above, the inner base extrusion 520 comprises a plurality of protrusions extending in an inward direction IN and a plurality of protrusions extending outwardly in an outward direction OT. The first protrusion is an inner upper protrusion 572, which extends in an inward direction IN along the horizontal direction H. The inner upper protrusion 572 includes a first L-shape flange 576 extending outwardly perpendicular to the horizontal direction. The first L-shape flange 576 supports the floor plate 504 and encases the bracket plate 260 that couples the inner base extrusions 520 or the corner extrusion assembly 104. The second protrusion is an outer upper protrusion 588, which extends in an outward direction OT along the horizontal direction H. As also discussed below, the outer upper protrusion 588 can support the side panels 124 by providing a shelf to support the panels 124 relative to gravity.

The third protrusion is an outer medial protrusion 592, which extends in an outward direction OT along the horizontal direction H. The outer medial protrusion 592 can include a protrusion 594 that bulges perpendicularly at the outer tip of the outer medial protrusion 592 or can be otherwise configured for engagement (e.g., snap engagement) with the protrusion 558. The fourth protrusion member is an inner lower protrusion 584, which extends in the inward direction IN along the horizontal direction H to be coupled with the foot plate 512 and to support a web 585 extending in an outward direction. The foot plate 512 is further coupled with the swiveling level mount 516 and may be adjusted by the adjusting nut 524. The fifth protrusion member is an outer lower Z-shaped protrusion 596. In particular, the outer lower Z-shape protrusion 596 can include a web 598 extending in the inward direction between the Z-shape protrusion and an end 600 at the outmost tip of the outer lower Z-shape protrusion 596 (e.g., shaped with a geometry complementary to the hooked portion of the flange 564 or otherwise configured for hinged engagement with the cover 112). In the illustrated embodiment, the web 598 is disposed opposite of the web 585 and can thus define a channel to receive one of the bracket plates 260.

The protrusions of the inner base extrusion 520 and the flanges of the outer lower covers 112 can be coupled together to form an assembly between an outer surface 548 of the inner base extrusion 520 and an inner surface 544 of the outer lower cover 112. In some examples, the lower panels can be snap-coupled to the inner base extrusion 520 via engagement of the protrusions 558, 594 and can be hingedly attached via engagement between the flange 564 and the rounded end 600. In particular, the outer medial protrusion 592 of the inner base extrusion 520 and the upper flange 556 of the outer lower covers 112 can be mated together by the protrusion 558 of the upper flange 556 and the protrusion 594 of the outer medial protrusion 592, forming a securable hinge mechanism. The protrusion 558 of the upper flange 556 can thus serve to selectively secure the cover 112 to the outer medial protrusion 592 at the protrusion 594 with the cover 112 in an installed orientation (as shown in FIG. 7). Additionally, the C-shape flange joint 568 of the lower flange 564 can engage the rounded end 600 outer lower Z-shape protrusion 596 to permit the cover 112 to be hinged, about the inner base extrusion 520. The securable hinge mechanism can thus secure the outer lower covers 112 securely with the inner base extrusion 520 and can also conceal the fasteners from viewers to improve security and aesthetic appearance of the display as a whole.

As also shown in FIG. 7, in some cases, threaded inserts 570 or other threaded profiles in the panel 124 can receive screws 574 inserted from inside the display case 100 to further secure the panel to the extrusions 212 (or other frame members). Thus, during installation of a panel (e.g., as also discussed with respect to FIGS. 13 and 18A-19B), the panel can be secured at select locations along a relevant horizontal frame member, as well as at the relevant corner joints. Moreover, the internal access required for the screw(s) 574 can provide even greater security against unauthorized access to the display case 100. For security, the screws 574 and the inserts 570 in combination can prevent the removal of the panel from the base frame. As similarly discussed relative to FIG. 3B, these components can also provide alignment of the panels relative to the frames to help ensure proper alignment with the magnetically engaged panels.

Referring to FIGS. 8 and 9, a rectangular base free-standing display case 800 is shown in accordance with the present disclosure that includes identical corner assembly components as the free-standing type display case 100 shown in FIG. 1. The rectangular base free-standing display case 800 includes a top panel 804, a floor plate 808, a front panel 812, a back panel 816, a right panel 820, and a left panel 824. The display case may be partitioned into an upper region 836, a medial region 840, and a lower region 844. The upper region 836 includes an outer upper panel 828, a top inner extrusion 864, and the upper region of the corner extrusion formed adjacent to the top panel 804 and the upper region 836 of the front panel 812, the back panel 816, the right panel 820 and the left panel 824 defining an upper periphery 848. The lower region 844 includes an outer lower cover 832 formed along the floor plate 808, an inner base extrusion 868 (e.g., four extrusions joined together, as shown). The lower region of the corner extrusion formed adjacent to the floor plate and the lower region of the front panel 812, the back panel 816, the right panel 820 and the left panel 824 define a lower periphery 852. The front panels 812 and the back panels 816 may be connected by a lap joint member 872 that extend perpendicular to the upper periphery 848 and the lower periphery 852 of the display case 800.

Figure 10:
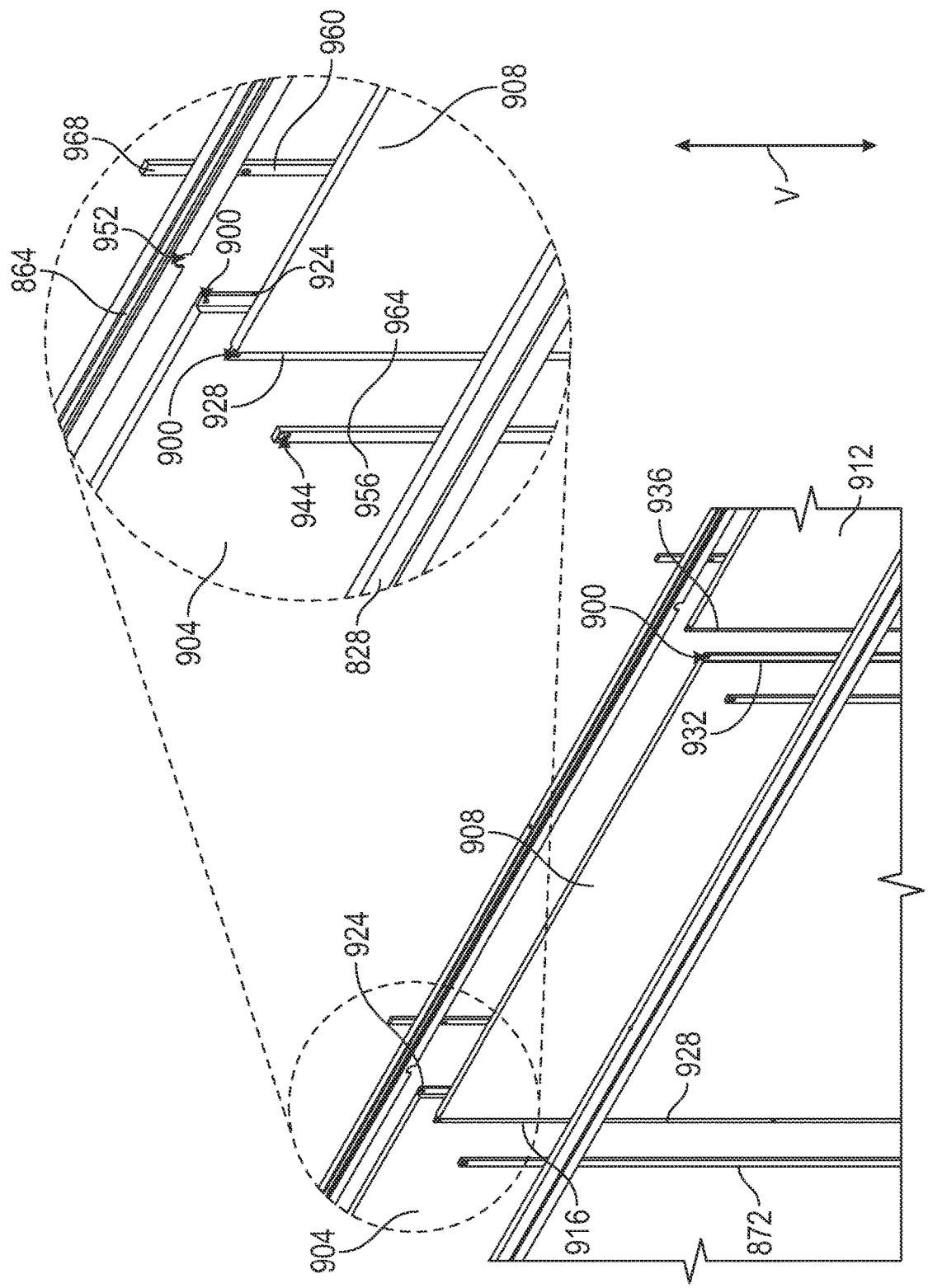
FIG. 10 illustrates an isometric exploded partial view and an inset detail view of joints between parallel panels on the display case of FIG. 8.
Figure 11:
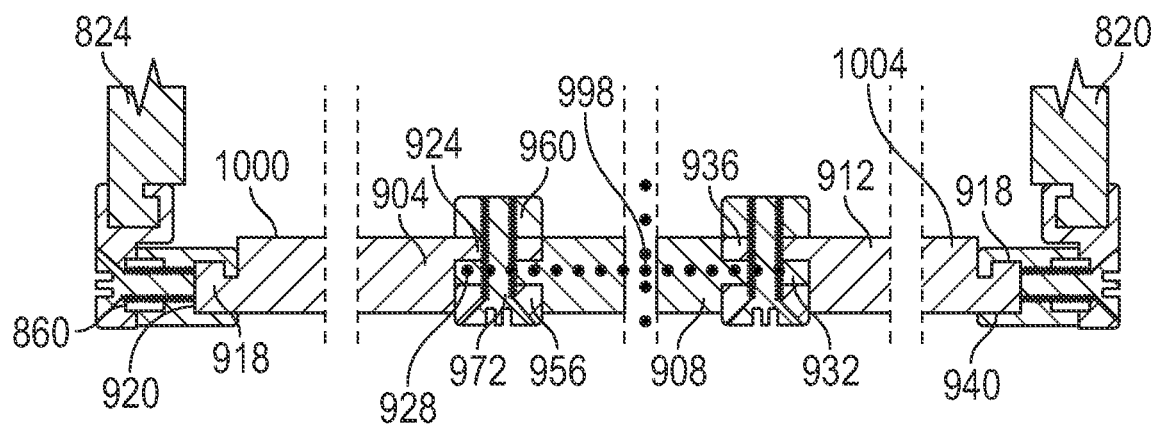
FIG. 11 is a top horizontal sectional partial view of the display case of FIG. 8 showing corner and side joints of the display case.
Figure 12:
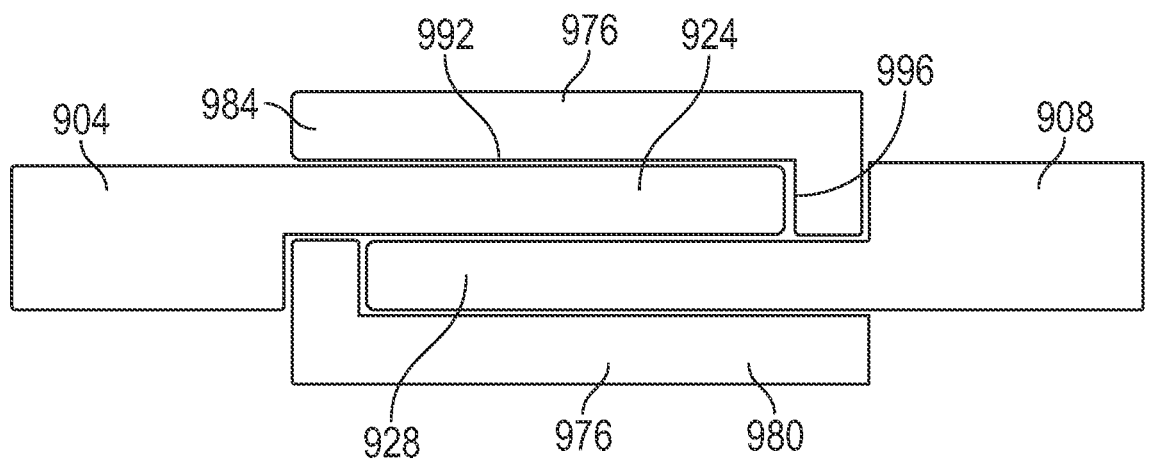
FIG. 12 is a top horizontal sectional partial view of another configuration for a side joint of the display case of FIG. 8.

Referring to FIG. 10-12, the lap joint member 872 connecting the front panels 812 and back panels 816 of the present disclosure is shown. The front panel 812 and the back panel 816 include a plurality of apertures 900 formed along the upper region 836 and the lower region 844 of the panel. The plurality of apertures 900 are concentric with other apertures located within the display case 800. In the present disclosure, the front panel 812 is formed by a leftmost front panel 904, a medial panel 908 and a rightmost front panel 912. The panel of the display case 800 includes a thinned side 916 along both side of the panel along the vertical direction V. In some embodiments, the side of the may be thinned between 30% and 50% of the overall thickness of the panels.

Specifically referring to FIG. 11, the leftmost front panel 904 includes a thinned left side contact 920 and a thinned right side contact 924. The medial panel 908 includes a thinned left side contact 928 and a thinned right side contact 932. The rightmost front panel 912 includes a thinned left side contact 936 and a thinned right side contact 940. The thinned left side contact 920 of the leftmost front panel 904 is coupled with the corner extrusion 860 and the thinned right side contact 924 of the left most front panel 904 is coupled with the left thinned side contact 928 of the medial panel 908, and is sandwiched between the front lap joint member 956 and a rear lap joint member 960.

The top inner extrusion 864 includes a mouse-hole shaped aperture 952, the aperture 952 formed to overlay (e.g., concentrically along an axis of) the first aperture 944 formed within the front lap joint member 956 and a tapped hole (not shown) formed within the rear lap joint member 960. In some embodiments, the tapped hole may receive a threaded fastener. The inner surface of the front lap joint member 964 and the inner surface of the rear lap joint member 968 sandwiches the thinned side 916 of the panels. For example, the plurality of aperture 900 of the panel aligns concentrically with the mouse-hole aperture 952, the first aperture 944 of the front lap joint member 956 and the tapped hole of the rear lap joint member 960. Through the concentric aperture, a fastener 972 is inserted to securely couple the panels with the lap joint member 872.

Referring to FIG. 12, another example lap joint member 976 configuration is shown. Similar to the lap joint member 872, the L-shape lap joint member 976 includes a front L-shape lap joint member 980 and a rear L-shape lap joint member 984. For example, the front L-shape lap joint member 980 and the rear L-shape lap joint member 984 sandwiches the thinned right side contact 924 of the leftmost front panel 904 and the thinned left side contact 928 of the medial panel 908, with shorter legs of the L-shapes of the joints. The panels are held in place by an inner surface 992 and an obstructing inner surface 996 of the L-shape lap joint member 976. The inner surface 992 applies compression between the plates while the obstructing inner surface 996 prevents the plates from sliding. In some embodiments, a fastener may be used to couple the panels and the lap joints.

Referring back to FIG. 11, the cross-sectional top plan view of the display case is shown. The thinned sides 916 of the leftmost front panel 904 resembles a S-block cross-sectional shape 1000, and the thinned left side contact 920 and the thinned right side contact 924 are placed diagonally opposite of each other. The thinned sides 916 of the rightmost front panel 912 resembles a Z-block cross-sectional shape 1004, and the thinned left side contact 936 and the thinned right side contact 940 are placed diagonally opposite of each other. The thinned left side contact 920 interacting with the corner extrusion 860 includes a hook flange 918 that is slid axially into the vertical passage (referring to 352, 372 of FIG. 5). Unlike the leftmost front panel 904 and the rightmost front panel 912, the medial panel 908 resembles a T-block cross-sectional profile 998 (expressed by dotted line), and the thinned left side contact 928 and the thinned right side contact 932 are straightly aligned to each other. The thinned sides 916 of the leftmost front panel and the rightmost front panels are positioned rearward with respect to the thinned sides of the medial front panels. This enables the medial panel 908 to be easily removed for cleaning the display case 800, adjustment of interior, or for maintenance of the object within the display case 800.

Figure 13:
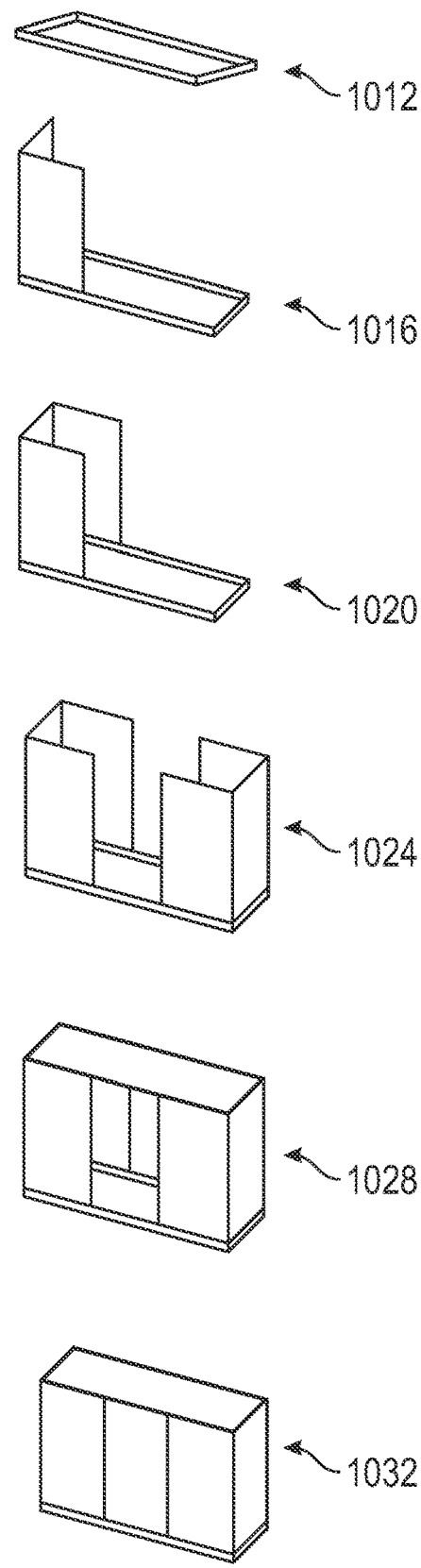
FIG. 13 illustrates aspects of a process of assembly or disassembly for the display case of FIG. 8.

Referring to FIGS. 8 and 13, an exemplary process of assembling the display case 800 is shown in accordance with the present disclosure. Referring to a first operation 1012, the inner base extrusion 868 is assembled together to form the lower periphery 852 of the display case 800. The inner base extrusion 868 is coupled using bracket plates 260 and a plurality of security fasteners. The inner base extrusion 868 may be coupled with additional components to provide adjustment in height. Referring back to FIG. 6, the bottom corner 500 is defined within the lower periphery 852. In some embodiments, the inner base extrusion 868 may be coupled with the foot plate 512 comprising the swiveling level mount 516 that enables adjustment of heigh of the display case 800. After the inner base extrusion 868 is coupled together, the floor plate 808 is mounted on to the inner base extrusion 868.

A second operation 1016 includes the assembly of the front left side corner extrusion and the placement of the corner panels. Referring back to FIG. 4, the corner extrusion includes the magnet corner extrusion 204 and the magnet keeper extrusion 208. The magnet corner extrusion 204 includes the magnet 220 and the magnet keeper extrusion 208 includes the magnet keeper 224, and the magnetic force between the magnet 220 and the magnet keeper 224 snaps the magnet corner extrusion 204 and the magnet keeper extrusion 208 in place. The magnetic force between the magnet 220 and the magnet keeper is strong enough to hold the corner extrusion together. The corner extrusion 860 is coupled with the inner base extrusion by a plurality of fastening mechanisms. The thinned corner edges of the panels are mounted through the vertical channels 352, 372 extending through the corner extrusions 860. The panels may be further secured using a fastening mechanism such as a dowel pin 240 along the inner base extrusion 868. In some cases, as also noted above, panels may be shipped with at least corner members pre-installed.

Similar to the second operation 1016, a third operation 1020 includes the assembly of the rear left side corner extrusion and the placement of the corner panels and fourth operation 1024 includes the assembly of the right side corner extrusions and the corner panels. Once all four corner extrusions 860 and the adjacent panels are assembled, the rear lap joints 960 may be partially coupled along the medial region of the display case 800. The inner surface of rear lap joint member 968 is assembled along the thinned side 916 of the panel. The rear lap joint member 960 may be secured to the inner base extrusion 868 by a fastening mechanism.

A fifth operation 1028 includes the assembly of the top inner extrusions 864. Referring back to FIG. 2, the top inner extrusions 864 are coupled with the corner extrusion 860 to form the upper periphery 848 of the display case 800. The top inner extrusion may be coupled with the corner extrusion by a fastening mechanism and may be coupled with the upper region 836 of the panels using a dowl pin for extra security and stability. The top inner extrusion may be coupled to each other by the bracket plate and plurality of fastening mechanisms. In some embodiments, the top inner extrusion 864 includes the J-groove edge 232, which allows security screws to be fastened through the panels and the corner extrusions 860. The J-groove edge 232 provides extra security while enabling easy disassembly process which is discussed later on. Once the top inner extrusion is assembled along the upper periphery 848, the top panel 804 may be placed on top of the top inner extrusion.

A final illustrated operation 1032 of the assembly includes the assembly of the medial panels 908 around to form the front panels 812 and the back panels 816, assembly of the lap joint member 872, and the coupling of the outer upper panels 828 and the outer lower panels 832. The configuration of the medial panel 908 allows the medial panel 908 to be inserted between the leftmost front panel 904 and the rightmost front panel 912 as described above. Once the medial panel 908 is positioned between the leftmost front panel 904 and the rightmost front panel 912, the front lap joint member 956 is coupled along the thinned sides 916 of the panels. The front lap joint member 956 and the rear lap joint member 960 sandwich the thinned layers of the panels and a fastener is used to fasten the lap joint member 872 and the panels together.

Once all the panels are in place, the outer upper panel 828 and the outer lower cover 832 may be coupled with the inner base extrusion 868 and the top inner extrusion 864. The outer upper panel 828 may be secured using a security screw in along the top surface of the outer upper panel in a top-to-down approach. The security screws located along the top surface of the outer upper panel provides extra security and makes the security screws inaccessible without a ladder or other elevation devices. As described in FIG. 7, the outer lower cover 832 may be coupled with the inner base extrusion 868. The hinge-lock protrusions 558, 594 of the outer lower cover 832 and the inner base extrusion 868 snaps the outer lower cover 832 and the inner base extrusion 868 together concealing the security screws and other fastening mechanisms while providing aesthetic appearance and extra exterior support to the panels.

The assembly of the display case 100 in the present disclosure may be assembled following the similar process and excluding the medial panel and the lap joints. Further, in some cases, other assembly processes may proceed in a different order than presented above, and with only a subset of the listed operations as applicable (e.g., during a partial demounting of a display case for cleaning or other maintenance). Further, in some cases, screws can also be used to secure panels to the relevant base or top extrusions (e.g., as discussed above with respect to FIGS. 3B and 7).

The process of disassembly of the display case may be the reverse of the process of assembly described above. The security screws located on the outer upper panel 828 fastening with the top inner extrusion 864 in the top-to-down approach is removed. Once the outer upper panels 828 are removed, the outer lower panels 832 are unclipped from the inner base extrusions 868. As needed, security fasteners attaching panels can be removed (e.g., relative to the inner base extrusion 868, the J-groove edge 232 of the top inner extrusion 864, the corner extrusion 860, etc.). By using a suction cup lifter or other device, the panels may then be removed by pivoting along the top inner extrusion to remove the lower edges of the panels from the supporting shelf (see also discussion of FIG. 7). In some embodiments, the display case may be partially demounted (e.g., with some panels remaining in place).

Figure 14:
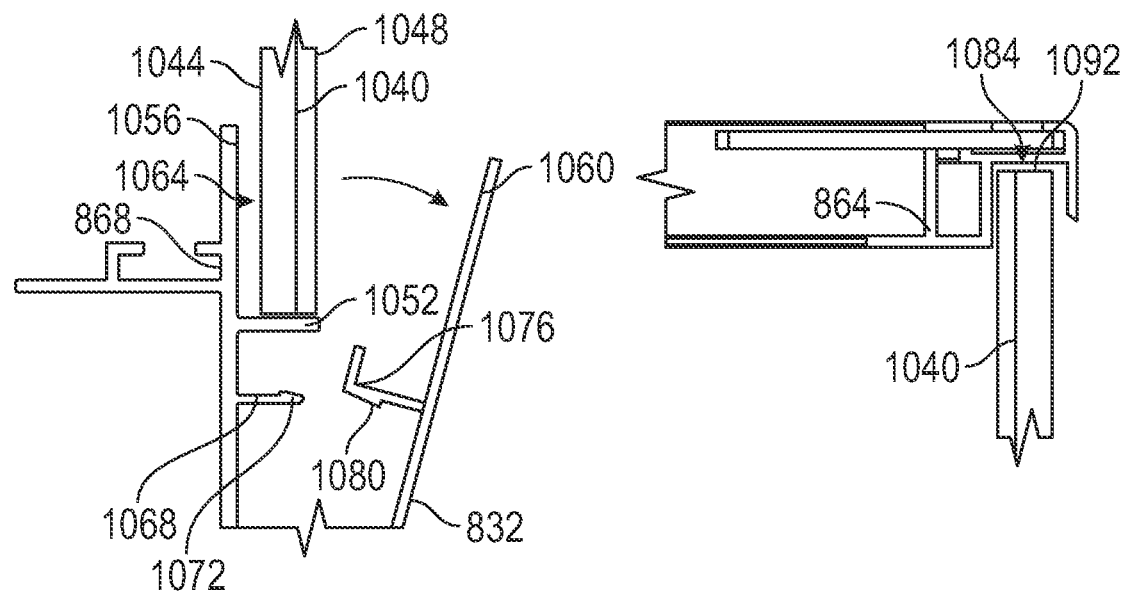
FIGS. 14 and 15 are a cross-sectional partial views of aspects of a process of installing or uninstalling a panel for a display case.
Figure 15:
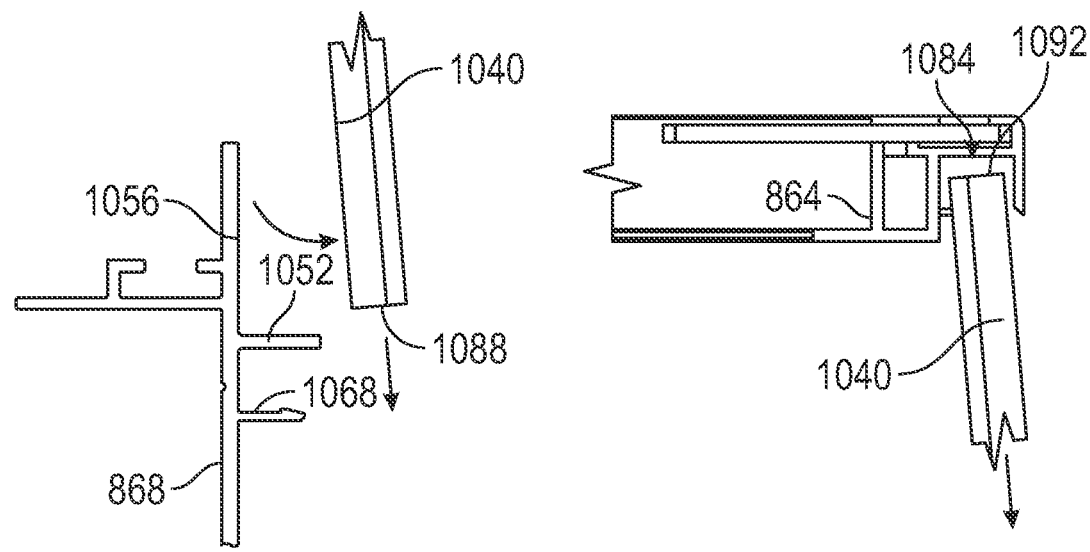

Referring to FIGS. 14 and 15, aspects of a disassembly (or assembly) process are shown. Specifically, FIGS. 14 and 15 show the removal (or addition) of the outer lower cover 832 and the removal (or addition) of the panel 1040, but identical operations can be implemented in some cases for disassembly (or assembly) of the display case 100 of FIGS. 1 through 7, or the display cases 1300 presented below. Prior to the disassembly, the inner base extrusion 868 and the outer lower cover 832 support an interior side 1044 and an exterior side 1048 of the panel 1040 while the panel 1040 is seated against gravity on a first protruding flange 1052. The inner base extrusion 868 defines an inner wall 1056 and the outer lower cover 832 defines an outer wall 1060. The inner wall 1056, the outer wall 1060 and the first protruding flange 1052 forms a lower cavity 1064 within which the panel 1040 is positioned. The lower cover 832 is removable, which in turn allows the panel 1040 to be easily removed during the disassembly. As similarly discussed relative to FIG. 7, which illustrates a similar arrangement, the inner base extrusion 868 includes a second protruding flange 1068 with a locking protrusion 1072, which locks the outer lower cover 832 in place during and after the installation of the display case. The outer lower cover 832 includes an inward protruding flange 1076 with a protruding locking member 1080 that is engaged with the locking protrusion 1072 from the second protruding flange 1068 of the inner base extrusion 868 when the cover 832 is fully installed.

Upon an outward (e.g., pivoting) movement of the outer lower cover 832, the protruding locking member 1080 of the outer lower cover 832 can then unlock from (e.g., snap off of) the locking protrusion 1072 of the inner base extrusion 868, thereby allowing the removable of the outer lower cover 832. Once the outer lower cover 832 is removed, the panel 1040 may be removed from the display case assembly. Specifically referring to FIG. 15, the panel 1040 may be engaged (e.g., grabbed by a suction cup lifter) at the exterior side 1048 of the panel 1040 and may then be pivoted within an upper channel 1084 formed by the top inner extrusion 864. Correspondingly (and, e.g., simultaneously), the bottom side 1088 of the panel 1040 can be lifted or slid off of the seated engagement with the first protruding flange 1052, allowing the panel 1040 to be slid downwards and the top side 1092 of the panel 1040 to be moved out of the upper channel 1084. The panel 1040, including with edge frame pieces (e.g., extrusions) still attached as applicable, can then be set aside for further operations (e.g., cleaning or maintenance operations, further similar disassembly of other panels, etc.).

As also noted above, in some cases, screws can also be used to secure panels to the relevant base or top extrusions, as discussed above in particular with respect to FIGS. 3B and 7. Similar approaches can also be used with respect to the operations illustrated in FIGS. 14 and 15, with the corresponding addition (as appropriate) of steps to remove (or install) screws to secure the panel 1040 directly to the inner base extrusion 868 or the top inner extrusion 864 (e.g., with generally the same arrangement as illustrated in FIGS. 3B and 7).

Figure 16:
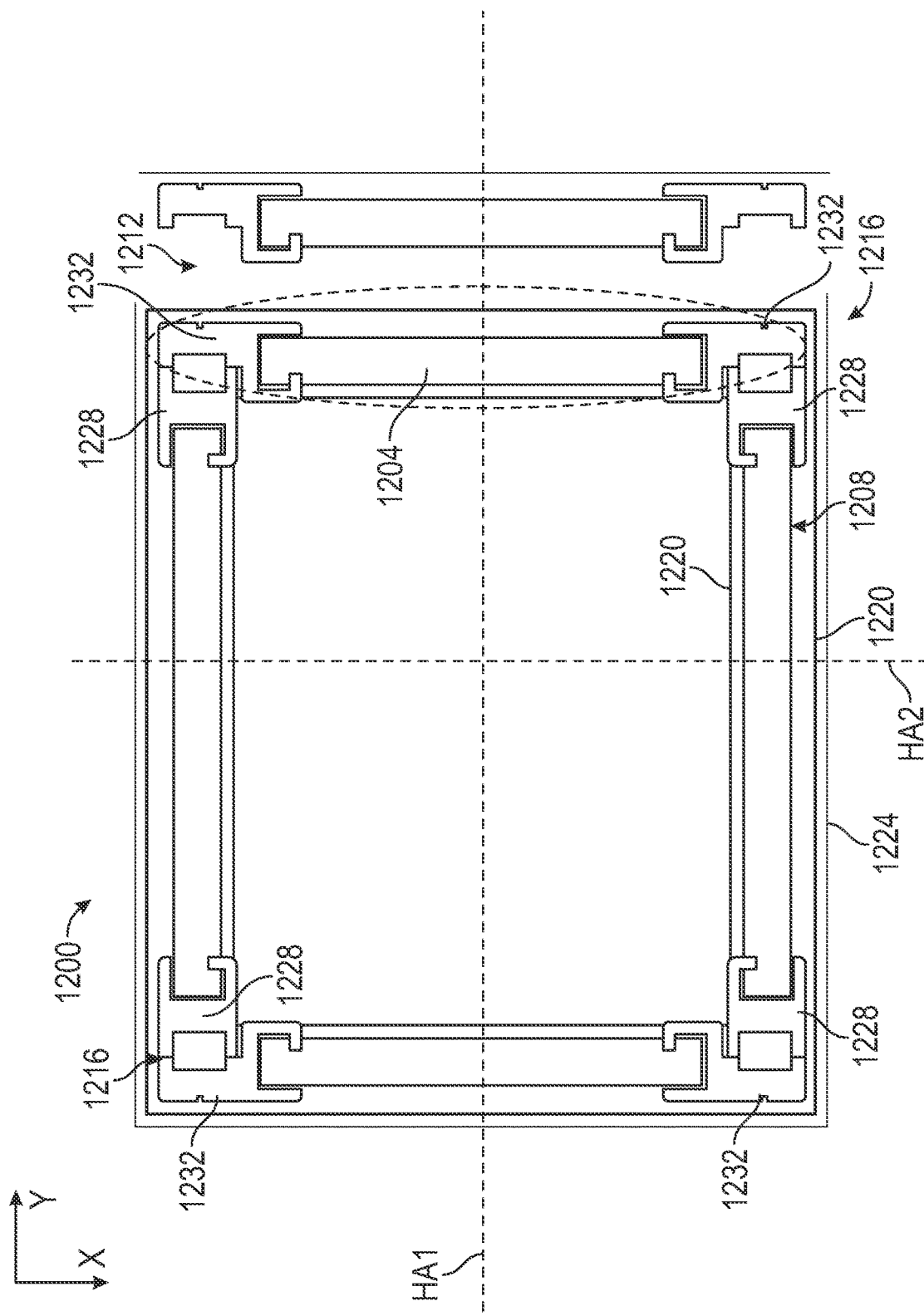
FIG. 16 is a top horizontal sectional partial view of another display case.

In some cases, corner assemblies can include additional (or alternative) structures to assist with alignment, including various complementary protrusions and recesses, or other similar arrangements. Referring to FIG. 16, for example, a different embodiment of a display case 1200 includes a panel 1204 with a side 1208 (e.g., a fixed side) and a side 1212 (e.g., a removal side). The display case 1200 includes a corner extrusion assembly 1104, a top inner extrusion 1220, and an upper outer panel 1224 (e.g., generally similarly configured as other similar extrusions discussed above). Separate, substantially identical corner extrusion assemblies form four corners of the display case 1200. In particular, the corner extrusion assembly 1104 includes a first corner extrusion 1228 that is defined by a Y-shaped cross-section and a second corner extrusion 1232 that is defined by a H-shaped cross section (e.g., with similar materials or overall profiles as other extrusions discussed above). Along the X-direction (see illustrated reference frame), two first corner extrusions 1228 are placed at opposite ends of the panel 1204, mirrored along a first horizontal axis HA1 between the first corner extrusions, to form the removal side 1212 of the display case 1200. Along the Y-direction, two second corner extrusions 1232 are placed at opposite ends of another panel, mirrored a second horizontal axis HA2 between the second corner extrusions, to form the fixed side 1208 of the display case 1200 is formed.

As also noted above, in some embodiments, corner extrusions may be coupled using sets of magnets (not shown) arranged as polar opposites. For example, referring to FIG. 17, the first corner extrusion 1228 includes a first magnetic component 1240 (e.g., a first magnet) and the second corner extrusion 1232 includes a second magnetic component 1236 (e.g., a second magnet or a ferrous body). The magnet components 1240, 1236 are arranged with opposite polarity, or otherwise complementary magnetic configurations, to impart an attractive magnetic force between the two corner extrusions. The magnetic force generated between is generally sufficient to couple the first corner extrusion 1228 and the second corner extrusion 1232 to form the corner extrusion assembly 1104, at least for staging to improve the ease of aligning and inserting any further fasteners.

Figure 17:
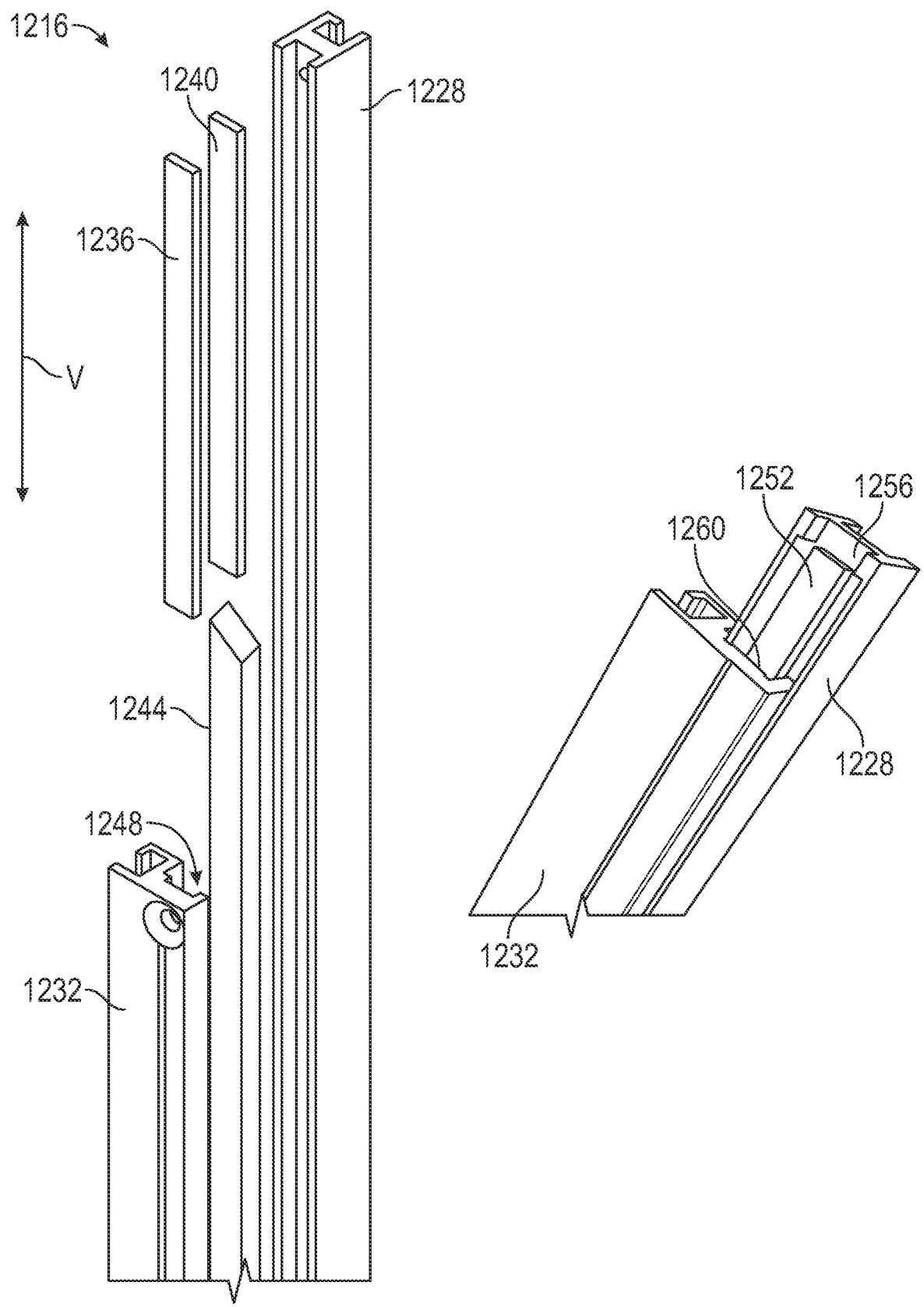
FIG. 17 shows exploded and perspective partial views of corner (vertex) joint and an alignment sub-assembly of the display case of FIG. 16.

In some embodiments, a corner extrusion assembly can include other alignment features, including as may supplement alignment forces from a magnetic arrangement or assist in overcoming misalignment forces that may result with some magnetic assemblies (e.g., for pairs of magnets and particular ferrous keeper components). For example, a corner extrusion can include (e.g., be integrally formed with) alignment features including a wide variety of configurations of protrusions and corresponding recesses (e.g., as complementary features on opposing portions of two corner extrusions) or other similar systems. In some embodiments, an alignment feature can be separately formed and received into a channel of an extrusion (e.g., to protrude from the extrusion for engagement with an opposing other extrusion). For example, as shown in FIG. 17, the corner extrusion assembly 1104 may include an alignment aid 1244 that is positioned to extend within recesses of both extrusions upon assembly (e.g., within the pocket 1248) and that thereby provides enhanced alignment between the first corner extrusion 1228 and the second corner extrusion 1232.

The corner extrusion assembly 1104 and the alignment aid 1244 may be formed from a different material. For example, the alignment aid 1244 may be formed from a lightweight material, such as a polymers or plastics of various known types. Further, as also discussed above, a magnetic component may in some cases also serve as a mechanical alignment aid.

In different examples, an alignment aid can have a variety of different configurations. In the present embodiment, the alignment aid 1244 is formed of a rectangular (e.g., square as shown) beam 1252, although other geometries are possible. The square beam 1252 is positioned along the vertical direction V within the pocket 1248 formed by the first corner extrusion 1228 and the second corner extrusion 1232 and the square beam 1252 is partially in contact with both a first inner surface 1256 of the first corner extrusion 1228 and a second inner surface 1260 of the second corner extrusion 1232. The square beam 1252 is positioned between the magnets along the vertical direction V providing enhanced alignment to the corner extrusion assembly 1104. For example, physical contact between the beam 1252 and the extrusions 1228, 1232 can prevent the extrusions 1228, 1232 from shifting out of alignment relative to one or more degrees of freedom (e.g., vertically, and also laterally in two directions).

In some examples, the corner extrusion assembly 1104 may not include an alignment aid 1244 disposed along the vertical direction V within recess of both extrusion upon assembly. Instead, the first corner extrusion 1228 may include the first corner magnetic component 1240 that is disposed within the recess of the first corner extrusion 1228, and the second corner extrusion may include the second corner magnetic component 1236 disposed within the recess of the second corner extrusion. The magnetic components 1236, 1240 will be in direct contact with each other. In some examples, the thickness of the magnetic components 1236, 1240 can be adjusted to provide improved fitting (e.g., fit to cover the recess volume of the pocket 1248) within the pocket 1248. In some examples, a gasket (not shown, e.g., rubber, silicone, polymer composites) can be disposed within the pocket 1248 to reduce the air exchange by reducing a gap between the first and second corner extrusions 1228, 1232.

Figure 18A:
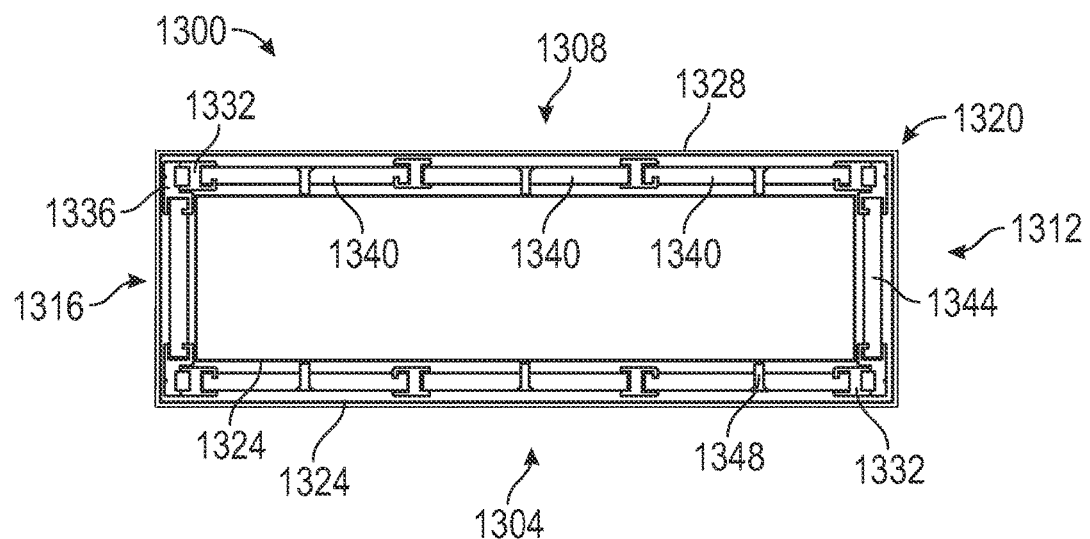
FIGS. 18A and 18B show top sectional views of another display case similar to the case of FIG. 16, illustrating operations for removal (or installation) of certain panels of the display case.
Figure 18B:
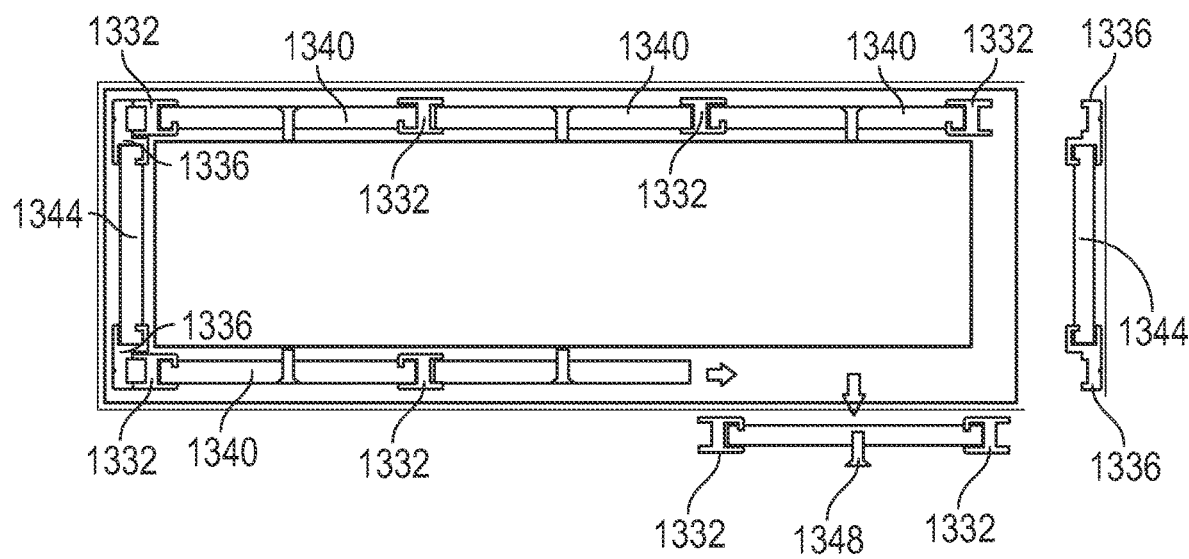

In some examples, similar (e.g., substantially identical) extrusions can be used for non-corner and for corner joints. Referring to FIGS. 18A and 18B, for example, a symmetrical display case 1300 formed as an alternative configuration of the display case 100 defines a front side 1304, a rear side 1308, a right side, 1312, and a left side 1316. The display case 1300 includes a corner extrusion assembly 1320, a top inner extrusion 1324, and an outer upper cover 1328. The corner extrusion assemblies 1320 include a first corner extrusion 1332 and a second corner extrusion 1336 similar to the extrusions 1232 of FIG. 16 described above. In particular, in the illustrated example, the corner extrusion assemblies 1320 include the first corner extrusion 1332 that is defined by a H-shaped cross-section and the second corner extrusion 1336 that is defined by a Y-shaped cross section. The front side 1304 and the back side 1308 of the display case 1300 includes a plurality of panels 1340 and the right side 1312 and the left side 1316 of the display case 1300 include panels 1344. The plurality of panels 1340 along the front side 1304 and the rear side 1308 of the display case 1300 are coupled together with the second corner extrusions 1332, which in this case can also serve as connectors along non-corner joints. The plurality of panels 1340 may include fasteners or stiffening supports 1348 as needed (e.g., implemented similarly to the screws 374, 574 discussed above). The right side and the left side panels 1344 of the display case 1300 is coupled with at corner joints that each include a set of the corner extrusions 1332, 1336. By removing the panel 1344 along the right side 1312 of the display case 1300, the plurality of panels 1340 along the front side 1304 of the display case may be removed from right to left. In this regard, although discussion of the display cases discussed above (e.g., the case 100) also generally applies to the case 1300, those of skill in the art will recognize that somewhat different assembly and disassembly orders may be used.

Figure 18C:
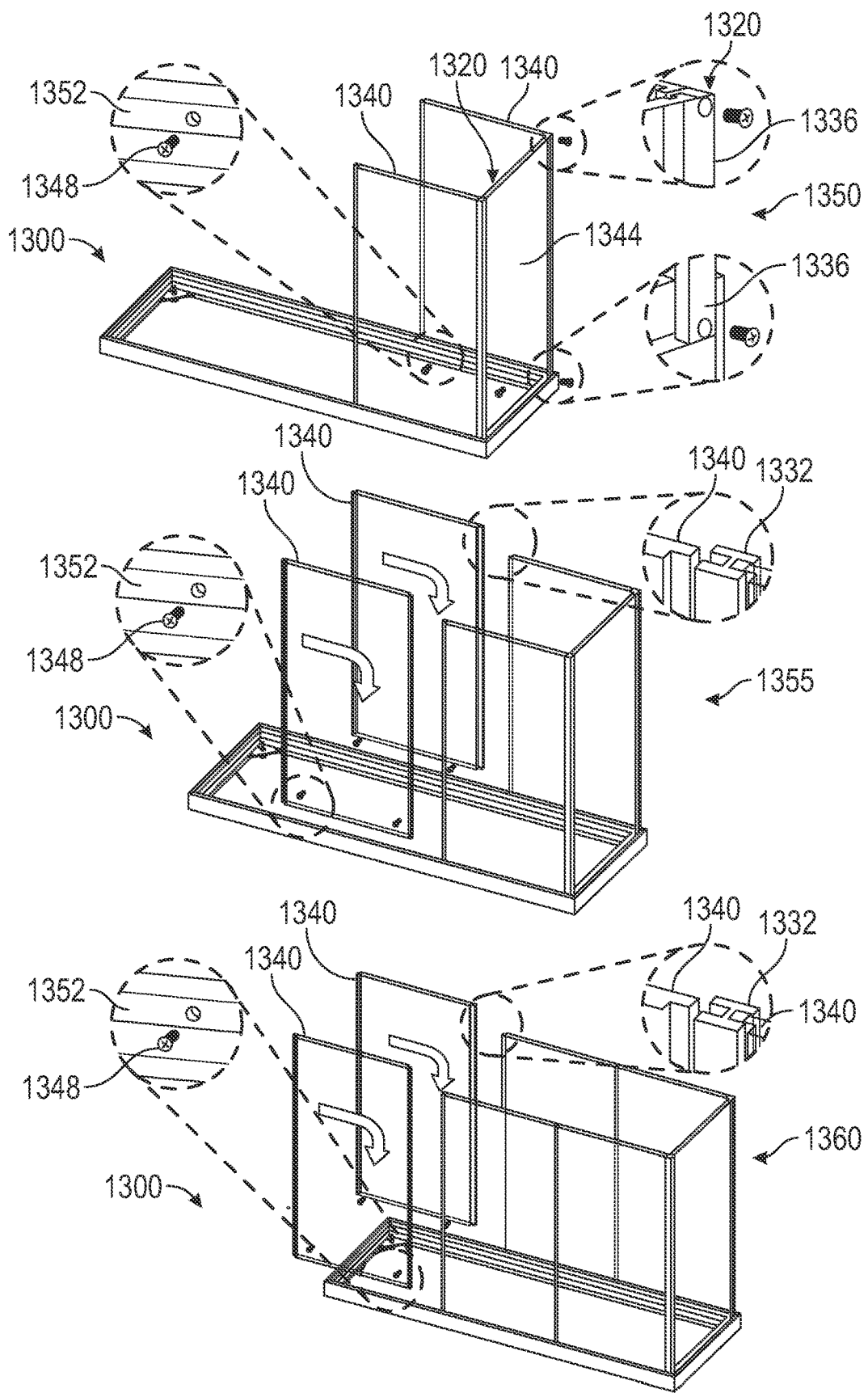
FIG. 18C illustrates further aspects of a process of installation or uninstallation for the display case of FIGS. 18A and 18B.

Further details of an example installation (or uninstallation) process for the display case 1300 are illustrated in FIG. 18C. In this example, in a first (or other) operation 1350, one of the panels 1344 and the adjacent set of the panels 1340 can be installed at a first end of the display case 1300, via magnetic engagement of the extrusions 1336, 1332 (see also FIGS. 18A and 18B) at the corner extrusion assemblies 1320 and attachment of threaded fasteners as needed (e.g., as show in detailed inset, and also discussed relative to other examples above). Threaded fasteners (e.g., fasteners 1348) can then also be extended through the panels 1340 (e.g., into threaded inserts thereof) to secure the panel 1340 to a base extrusion 1352 of the display case 1300, as also shown in detailed inset in FIG. 18C (e.g., and as illustrated and discussed relative to FIGS. 3B and 7). At operations 1355, 1360, with these three panels 1344, 1340 thus secured in place, the additional panels 1340 can then be installed in sequence (i.e., moving from right to left on the page, in the illustrated example). In particular, as also noted above, the panels 1340 can be successively joined using the extrusions 1332, also with corresponding engagement of threaded fasteners as needed (e.g., to further secure the panels 1340 to the base extrusion 1352, as shown and as similarly discussed relative to FIGS. 3B and 7). As also shown in FIG. 18C, ends of the panels 1340 can be contoured as needed, to be received into the relevant channels of the extrusions 1332, as also generally discussed above and below. Finally (or otherwise), the second panel 1344 (see FIGS. 18A and 18B) can be secured in place using the corresponding extrusions 1332, 1336, as similarly discussed above.

Figures 19A, 19B:
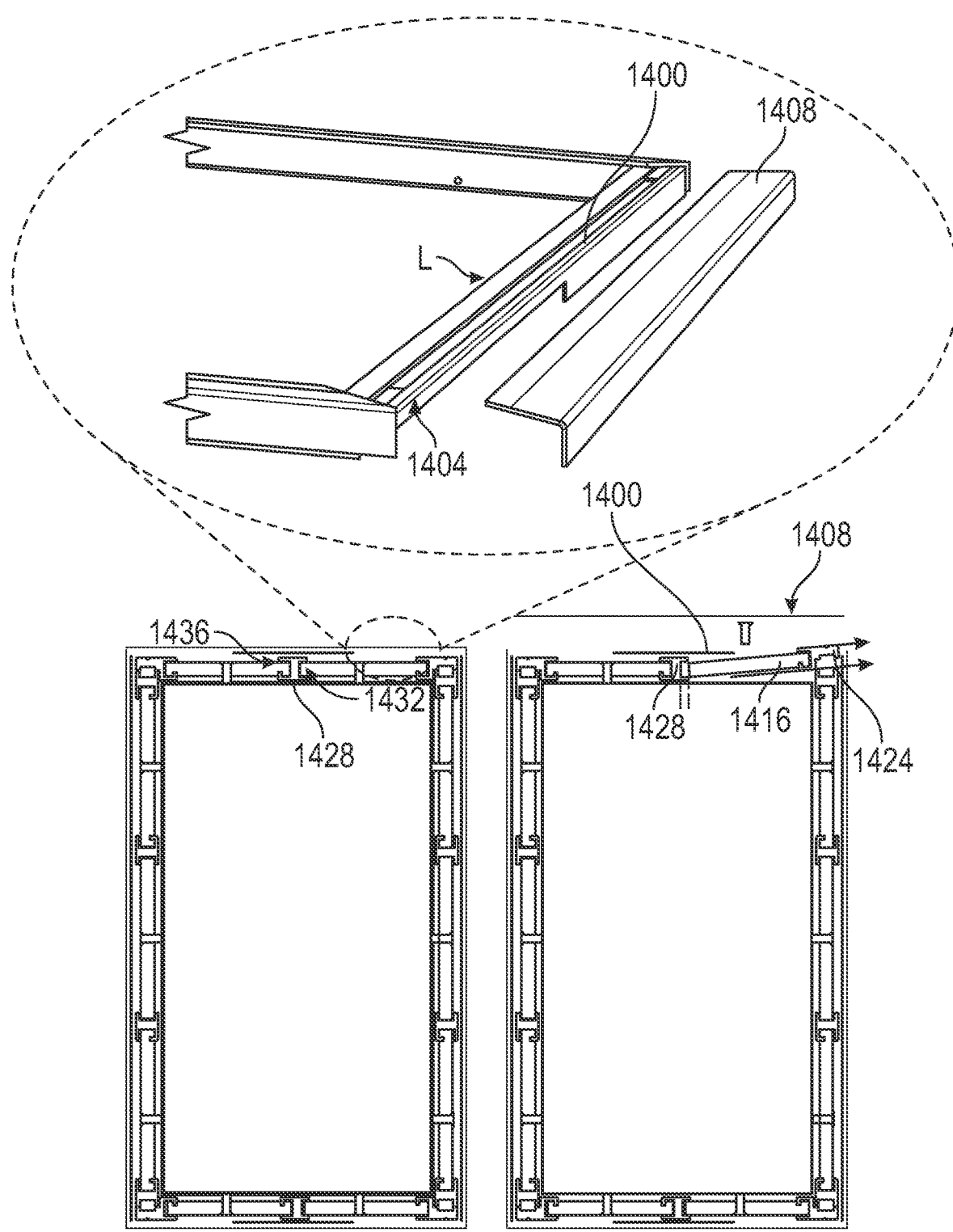
FIGS. 19A and 19B show top horizontal sectional partial views and a top perspective partially exploded partial view of another display case similar to the case of FIG. 18, illustrating operations for removal (or installation) of certain panels of the display case.

Further in this regard, FIGS. 19A and 19B illustrate another alternate configuration of the display case 1300 (and 100) in which a top inner frame member (e.g., extrusion) 1400 includes a relatively large mouse hole access opening 1404. In some embodiments, the access opening 1404 may be greater than about 30% and up to 100% (inclusive) of a length L of the frame member 1400. The access opening 1404 provides extra clearance during the removable of the panels 1416, as may allow lateral pivoting of a panel 1416 for removal from an associated side-joint extrusion. Thus, for example, the panel 1416 may be removed after detaching an upper cover 1408, by pivoting the assembly of the panel 1416 and a first Y-shaped corner extrusion 1424 laterally outward (e.g., about a vertical axis) to be removed from a H-shaped extrusion 1428 at a parallel-panel side joint (e.g., after removing a pin or other fastener that secures the panel 1416 to the side-joint extrusion 1428). Thus, for example, a single extrusion profile can be used for corner joints and parallel joints between panels of a display case, with corresponding improvements in security of the installed panels, and in the ease of installation and uninstallation.

Figure 20:
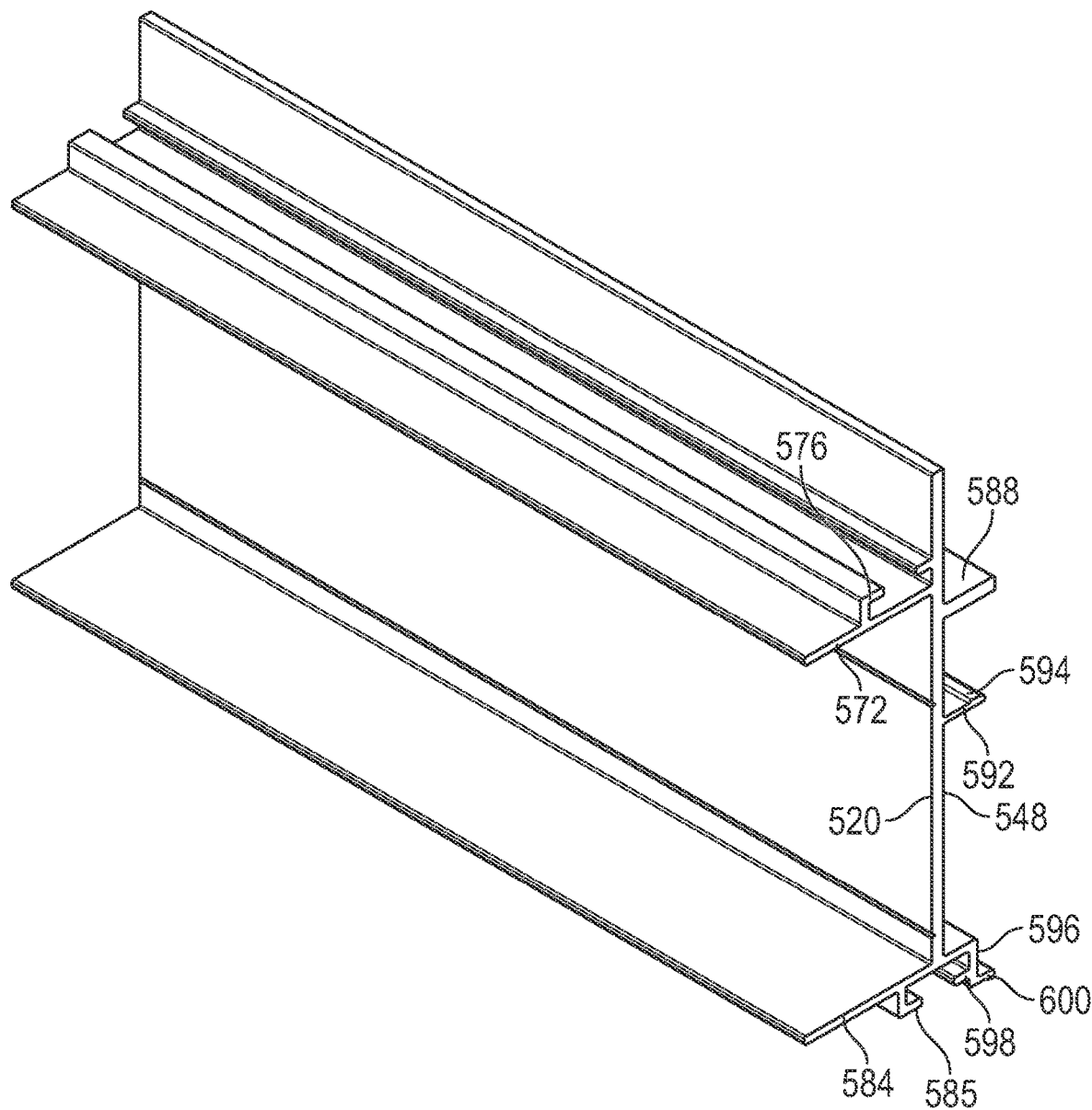
FIG. 20 is an isometric view of another configuration of a base extrusion for display cases according to the disclosure.
Figure 21:
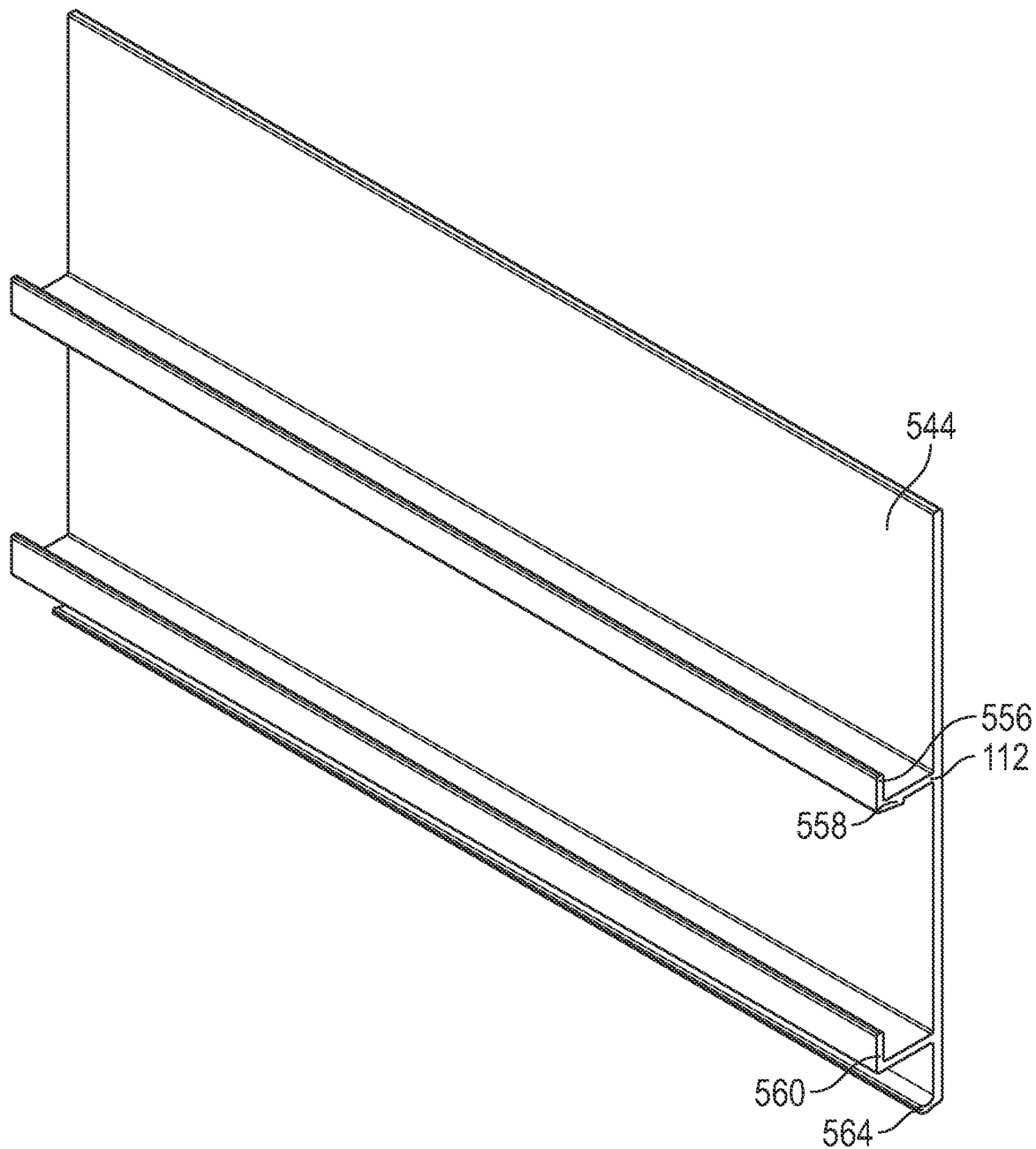
FIG. 21 is an isometric view of another configuration of a lower panel for display cases according to the disclosure.

As generally discussed above, various frame members and covers according to the disclosed technology can exhibit various geometric profiles. Referring to FIG. 20, for example, an alternative configuration of the inner base extrusion 520 is presented with reference numbers that are identical to those of FIG. 7. For example, the inner base extrusion 520 as shown in FIG. 20 includes an outer medial protrusion 592 disposed between an outer upper most protrusion 588 and a Z-shape protrusion 596. Similarly, FIG. 21 illustrates an alternative configuration of the lower cover 112 that is configured to be removably coupled with the inner base extrusion 520 of FIG. 20. The alternative embodiment of the lower cover 112 also includes reference numbers that are identical to those of FIG. 7. For example, the lower cover 112 has a medial flange 560 disposed between an upper flange 556 and a lower flange 564.

Figure 22:
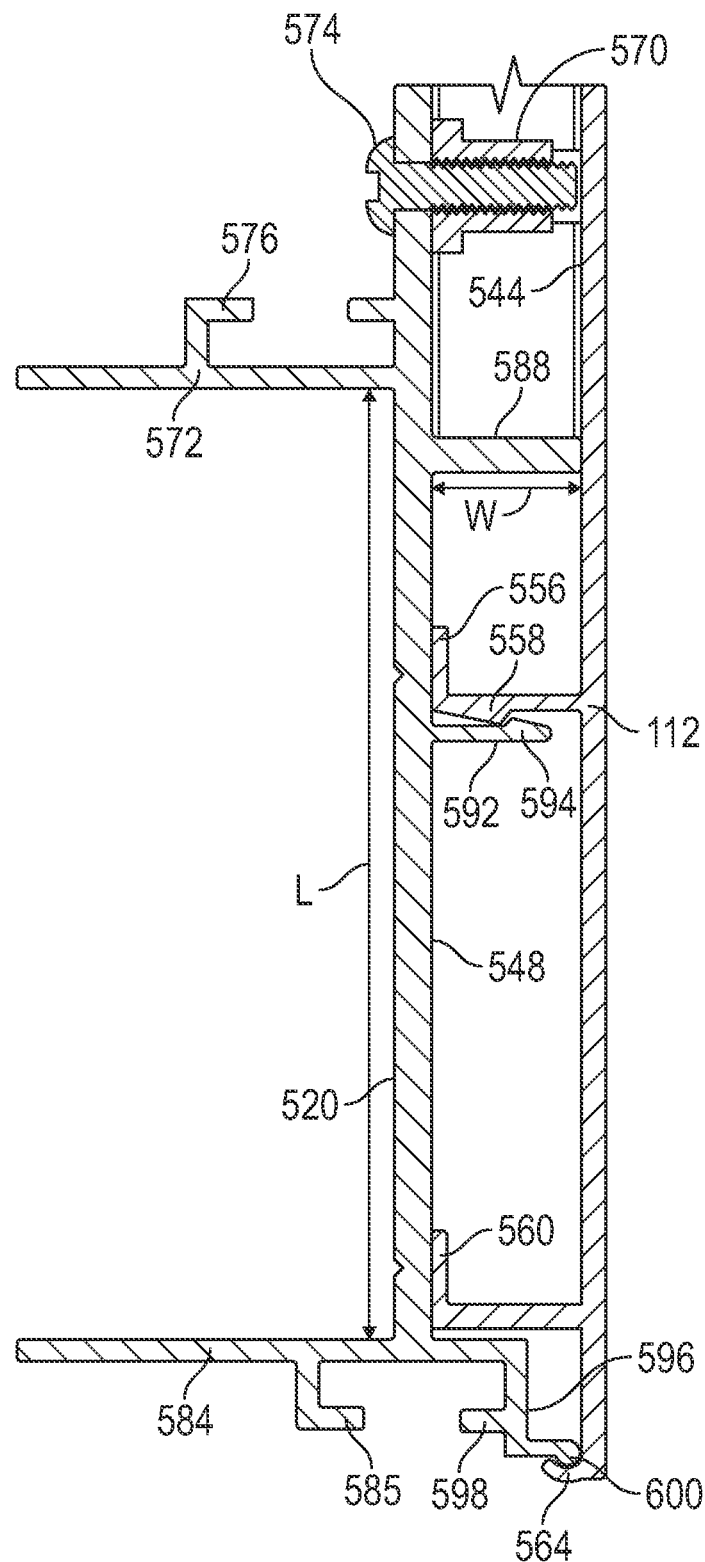
FIG. 22 is a cross-sectional view of an assembled configuration of the base extrusion and the lower panel of FIGS. 20 and 21.

Relative to the example of FIG. 22, additional security along non-accessible panels may be achieved by riveting (or otherwise mechanically attaching) the lower cover 112 to the base extrusion 520 at the vertical flanges 556 and 560. Various structures, including grooves as shown along the interior of the structure can aid in the placement of these attachments.

To adapt to varied needs of various cases, various covers and frame members can exhibit varied configurations for support of panels, for snap (or other) couplings, and so on (e.g., corresponding to various dimensional or other differences). For example, the outer medial protrusion 592 may be disposed at different location (e.g., between the upper most protrusion 588 and the Z-shape protrusion 596). As illustrated in FIG. 22, for example, the location of the outer medial protrusion 592 of the inner base extrusion 520 is disposed further apart from the upper most protrusion 588 along a length L of the inner base extrusion 520 in comparison to the outer medial protrusion 592 of FIG. 7. Accordingly, the location of the medial protrusion of the lower cover 112 can be accommodated to a corresponding location to removably couple the lower cover 112 to the inner base protrusion 520.

In some examples, a width W of the outer upper protrusion 588 and the outer medial protrusion 592 may be wider or shorter to accommodate the thickness of the panel (not shown), and accordingly, the width W of the upper flange 556 and the medial flange 560 can be adjusted based on the width of protrusions 588, 592 of the inner base protrusion 520 to provide appropriately located stops for movement of the cover 112 toward the extrusion 520.

Various frame members discussed herein, including the top inner extrusions, the corner extrusions, the inner base extrusions, the outer upper panel, and the outer lower panel may be manufactured from various metallic or non-metallic material. For example, the aforementioned extrusions and panels may be formed from any one of or an alloy of aluminum, bronze, brass, copper, stainless steel, carbon steel, titanium, zinc, polymeric materials, or other suitable materials. In some embodiments, the material of the extrusions and the material of the panels may be different. In some embodiments, the extrusion and panels formed from different materials may be painted or varnished to an identical color or finish. In some embodiments, non-extruded frame members can be used.

In some embodiments, the display casing system can be shipped to the intended site of assembly in a flat packed configuration, including as facilitated by one or more of the extruded (e.g., aluminum) elements, panel profiles, magnetic arrangements and other components and systems discussed above. Correspondingly, embodiments of the present disclosure can allow for improved assembly and disassembly of the enclosure with minimization of assembly effort and skills, including for settings with limited space around or above the display case installation. For example, due to the installation and de-installation processes discussed above, some embodiments require only a limited headroom above the enclosure to successfully assemble and disassemble the enclosure. Further, to deter unauthorized access to the objects within the case, relevant fasteners can be hidden from sight (e.g., above the eyeline).

Some examples are discussed above with respect to particular manufacturing techniques (e.g., extrusion) and materials (e.g. aluminum). In other example, similar or other assemblies can be formed according to this disclosure using different techniques or materials.

Any of the embodiments described herein may be modified to include any of the structures or methodologies disclosed in connection with different embodiments. Further, the present disclosure is not limited to display cases of the type specifically shown. Still further, aspects of the display cases of any of the embodiments disclosed herein may be modified to work with any type of display cases.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Similarly, unless otherwise specified or limited, the terms "about," "approximately," and "substantially" as used herein with respect to a reference value refer to variations from the reference value of ±5%, inclusive.

As used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A display case comprising:
   a first panel having a first edge profile;
   a second panel having a second edge profile;
   a first edge piece having a first recess that receives the first edge profile to secure the first edge piece to the first panel;
   a second edge piece having a second recess that receives the second edge profile to secure the second edge piece to the second panel; and
   a first fastener and a second fastener that threadedly secure the first edge piece to the second edge piece;
   the first edge piece including a first magnetic component; and
   the second edge piece including a second magnetic component;
   wherein the first and second fasteners extend transversely through a first attachment channel of the first edge piece that receives the first magnetic component and transversely through a second attachment channel of the second edge piece that receives the second magnetic component; and
   wherein, the first magnetic component is aligned with the second magnetic component to magnetically secure the first and second panels together at a panel joint of the display case.

2. The display case of claim 1, wherein the panel joint is a corner joint of the display case.

3. The display case of claim 2, wherein, from a perspective moving from outside the display case toward inside the display case, a part line between the first and second edge pieces at the corner joint intersects a wall of one of the first or second edge pieces that defines the corresponding first or second recess.

4. The display case of claim 3, wherein, from a perspective moving from inside the display case to outside the display case, the part line intersects a wall of the other of the first or second edge pieces.

5. The display case of claim 2, wherein, at the outside of the display case, a part line between the first and second edge pieces extends along the corner joint, spaced apart from a corner edge of the corner joint.

6. The display case of claim 1, wherein the first attachment channel extends along a vertical height of the first edge piece; and
   wherein the first magnetic component is a first magnet included in a plurality of magnets within the first attachment channel.

7. The display case of claim 1, wherein the first magnetic component extends proud of the first edge piece and extends into the second edge piece to magnetically engage the second magnetic component, the first magnetic component thereby aligning and securing the first edge piece relative to the second edge piece at a corner joint of the display case.

8. The display case of claim 7, wherein the first attachment channel extends along a vertical height of the first edge piece and the second attachment channel extends along a vertical height of the second edge piece; and
   wherein the first magnetic component extends from the first attachment channel to be proud of the first edge piece and extends into the second attachment channel to magnetically engage the second magnetic component.

9. The display case of claim 1, wherein
   no threaded fastener other than the first and second fasteners secures the first edge piece to the second edge piece.

10. The display case of claim 1, wherein no threaded fastener on the panel joint is visible from outside the display case.

11. A display case comprising:
    a first panel that defines a first viewing area of the display case;
    a second panel that defines a second viewing area of the display case;
    a top extrusion that defines an upper channel;
    a base extrusion including a first protruding flange;
    a base cover that engages a second protruding flange of the base extrusion to secure the first panel on the first protruding flange;
    a first magnetic assembly that supports a first magnetic component at first edge of the first panel, the first magnetic component including one or more of a first magnet or a first ferrous component; and
    a second magnetic assembly that supports a second magnetic component at a second edge of the second panel, the magnetic component including one or more of a second magnet or a second ferrous component;
    the first and second magnetic assemblies being magnetically secured together by the first and second magnetic components to secure the first and second panels together at a corner joint of the display case;
    an upper edge of the first panel being received into the upper channel, and the lower region of the first panel being seated on the first protruding flange of the base extrusion; and
    the base cover being hingedly engaged with the base extrusion to be pivotably movable into engagement with the second protruding flange.

12. The display case of claim 11, wherein the first magnetic assembly includes a first corner extrusion that supports the first magnet component and includes a first recess that receives a first edge profile of the first panel to secure the first panel to the first magnetic assembly; and
    wherein the second magnetic assembly includes a second corner extrusion that supports the second magnetic component and includes a second recess that receives a second edge profile of the second panel to secure the second panel to the second magnetic assembly.

13. The display case of claim 12, wherein the first recess is a first hooked recess and the first edge of the first panel is a first hooked protrusion complementary to the first hooked recess.

14. The display case of claim 13, further comprising:
- a third panel that defines a third viewing area of the display case and a third edge; and
- a side joint extrusion that includes: a second hooked recess that receives a second hooked protrusion of the first panel to secure the side joint extrusion to the first panel, and a U-shaped recess that receives the third edge to secure the side joint extrusion to the third panel.

15. The display case of claim 12, wherein the first magnetic assembly extends into the second magnetic assembly to mechanically align the first and second panels.

16. A process for a display case, the process comprising, to assemble the display case:
- aligning a first panel with a second panel by inserting a top portion of the first panel into an upper cavity of an upper frame member of the display case, the first panel defining a first viewing area of the display case and the second panel defining a second viewing area of the display case;
- seating a bottom portion of the first panel on a shelf of a base frame member of the display case;
- magnetically securing a first magnetic assembly at a first edge of the first panel to a second magnetic assembly at a second edge of the second panel to secure the first and second panels together at a corner joint of the display case, the first magnetic assembly supporting a first magnetic component that includes one or more of a first magnet or a first ferrous component and the second magnetic assembly supporting a second magnetic component that includes one or more of a second magnet or a second ferrous component to magnetically engage the first magnetic component; and
- hinging a base cover into engagement with the base frame member to secure the first panel on the shelf.

17. The process of claim 16, further comprising, to disassemble the display case:
- without removing the first panel from the first magnetic assembly, moving the first panel off of the base shelf to remove the first panel from the top channel and magnetically disengage the first panel from the display case.

* * * * *